US012657652B2

(12) United States Patent
Selan et al.

(10) Patent No.: US 12,657,652 B2
(45) Date of Patent: Jun. 16, 2026

(54) DUAL DETAIL ENCODING IN A DISTRIBUTED SYSTEM

(71) Applicant: Valve Corporation, Bellevue, WA (US)

(72) Inventors: Jeremy Adam Selan, Kirkland, WA (US); Charles N. Lohr, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 599 days.

(21) Appl. No.: 18/087,431

(22) Filed: Dec. 22, 2022

(65) Prior Publication Data

US 2024/0212090 A1　Jun. 27, 2024

(51) Int. Cl.
*G06T 3/40* (2024.01)
*G06T 9/00* (2006.01)

(52) U.S. Cl.
CPC . *G06T 3/40* (2013.01); *G06T 9/00* (2013.01)

(58) Field of Classification Search
CPC .......... G06T 3/40; G06T 9/00; G06T 19/006; G02B 27/017; G02B 27/0172; H04N 13/344; H04N 13/341; H04N 13/332; H04N 13/383; A63F 2300/8082; G09G 5/14; G09G 2340/0407; G09G 2350/00
See application file for complete search history.

(56) References Cited

U.S. PATENT DOCUMENTS

| | | | |
|---|---|---|---|
| 2016/0267884 A1* | 9/2016 | Binstock | G06F 3/013 |
| 2017/0236466 A1* | 8/2017 | Spitzer | G09G 3/3266 |
| | | | 345/560 |

| | | | |
|---|---|---|---|
| 2017/0287447 A1* | 10/2017 | Barry | G09G 5/391 |
| 2017/0316601 A1* | 11/2017 | Kakarlapudi | G06T 19/20 |
| 2018/0275410 A1 | 9/2018 | Yeoh | |
| 2019/0019315 A1* | 1/2019 | Bastani | H04N 19/172 |
| 2020/0068002 A1* | 2/2020 | Cheung | H04L 67/60 |
| 2020/0264701 A1 | 8/2020 | Tokubo | |
| 2021/0136397 A1* | 5/2021 | Lakshmikantha | H04N 19/48 |
| 2022/0366820 A1* | 11/2022 | Goswami | G09G 5/001 |

OTHER PUBLICATIONS

PCT Search Report and Written Opinion mailed Apr. 11, 2024 for PCT Application No. PCT/US23/84328 from PCT Summary, 16 pages.

* cited by examiner

*Primary Examiner* — Stephen R Koziol
*Assistant Examiner* — Michael Kim Maiden
(74) *Attorney, Agent, or Firm* — Lee & Hayes, P.C.

(57) ABSTRACT

Described herein are, among other things, techniques for implementing a dual detail encoding scheme in a distributed display system. At the host computer, an application may render a frame for a scene at a first resolution. The host computer may generate a two-dimensional (2D) array of pixels for the frame, encode the 2D array of pixels, and transmit the encoded pixel data to the display device. The 2D array of pixels comprises, for each eye, a copy of the frame downscaled to a second resolution less than the first resolution, and a copy of a subregion of the scene. At the display device, the encoded pixel data is decoded to obtain the 2D array of pixels for the frame, which is modified by enlarging the copies of the frame so that images can be generated using the enlarged copies of the frame and the copies of the subregion with blending.

20 Claims, 6 Drawing Sheets

300A

300B

DUAL DETAIL ENCODING IN A DISTRIBUTED SYSTEM

BACKGROUND

Wireless streaming technology is used both within and outside of the video game industry. In the video game industry, some virtual reality (VR) gaming systems utilize wireless streaming technology in order to leverage the high-computing capacity of a host computer for executing a video game, while providing a wearer of a wireless VR headset with greater mobility, as compared to a tethered (non-wireless) headset. Despite these advantages, data rates of existing wireless protocols limit the amount of data that can be sent in a relatively short amount of time. This presents challenges in VR gaming systems that operate at high frame rates, especially when playing graphics intensive video games.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
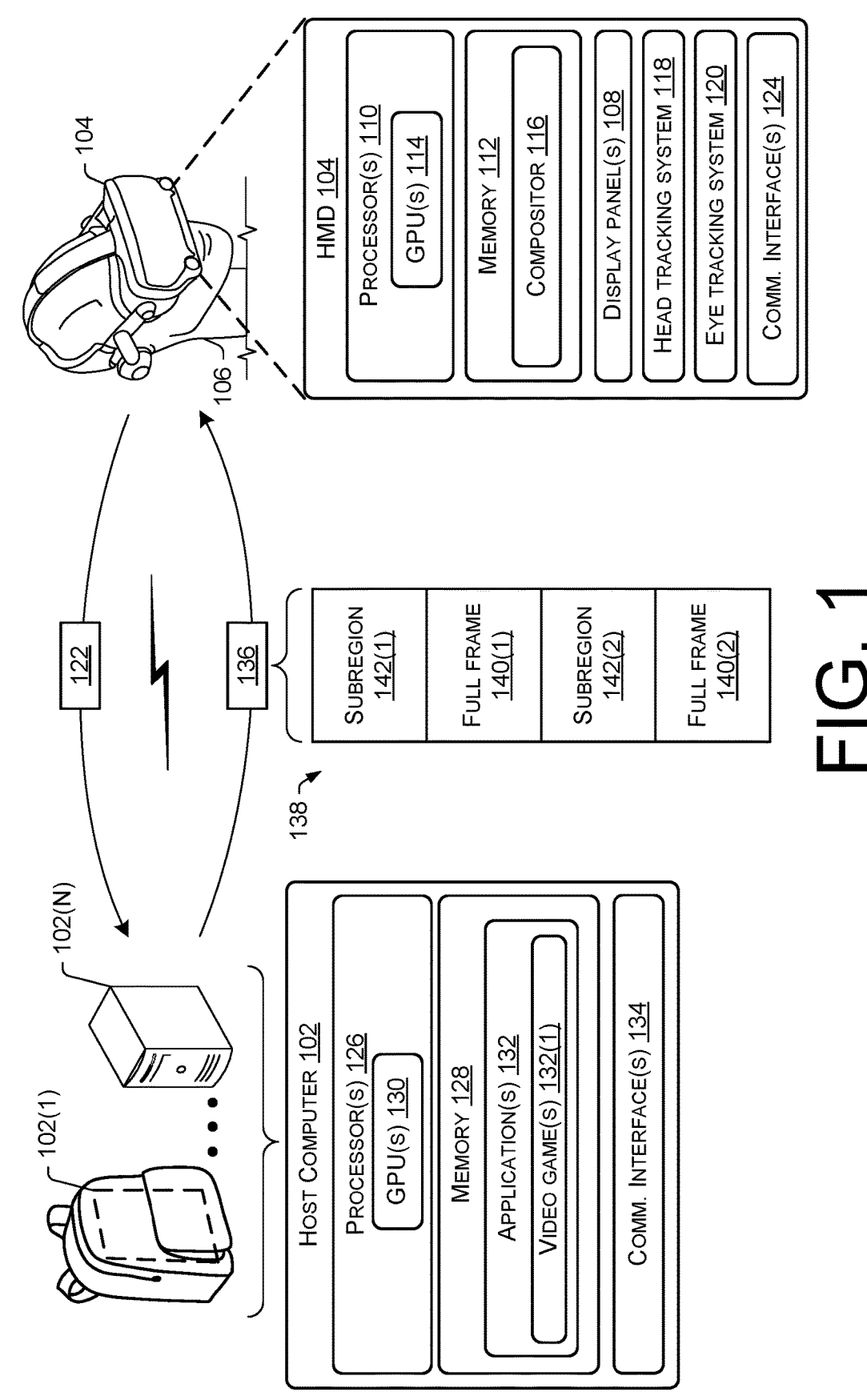
FIG. 1 is a diagram illustrating an example distributed display system including a host computer and a display device in the form of a head-mounted display (HMD), in accordance with embodiments disclosed herein.

Described herein are, among other things, techniques, devices, and systems for streaming pixel data from a host computer to a display device using a dual detail encoding scheme. This dual detail encoding scheme allows for transporting pixel data, among other data, from a host computer to a display device in a timely manner and without compromising the perceived fidelity of the imagery that is displayed on the display device. This is particularly beneficial when streaming real-time content, such as video game content. For instance, unlike prerecorded content, real-time content cannot be streamed in advance and buffered on the client until the content is ready to be displayed. Instead, frames are rendered milliseconds before the content is displayed based on data received from the display device.

While the forthcoming description is not limited to gaming systems, or even to VR systems, many of the examples described herein pertain to a VR gaming system that includes a host computer and a HMD communicatively coupled thereto. It is to be appreciated, however, that a HMD is just one example of a "display device" that can be utilized for displaying streamed content, and other types of display devices are contemplated herein. Furthermore, the techniques described herein may be implemented in wireless distributed systems and/or wired distributed systems (e.g., a host computer and a display device connected via a cable). In distributed systems that include a HMD, the HMD may be worn by a user for purposes of immersing the user in a VR environment or an augmented reality (AR) environment, as the case may be. One or more display panels of the HMD are configured to present images based on data generated by an application (e.g., a video game). The application executes on the host computer and generates pixel data for individual frames of a series of frames. The pixel data is encoded and sent (or transmitted) from the host computer to the HMD to present images that are viewed by a user through the optics included in the HMD, making the user perceive the images as if the user was immersed in a VR or AR environment.

In some embodiments, the HMD is configured to send data to the host computer, and the host computer is configured to use the data in various ways, such as to generate the pixel data for a given frame. For example, the host computer may use head tracking data received from the HMD to generate pose data indicative of a predicted pose that the HMD will be in at a time at which light emitting elements of the display panel(s) of the HMD will illuminate for the frame. This pose data may be input to the executing application (e.g., a video game) to generate the pixel data for a given frame. In some examples, as will be described in more detail below, eye tracking data received from the HMD may be used to determine a subregion of a scene that is ultimately displayed with higher quality than a remainder of the displayed image so that the user is looking at a more detailed portion of the image, which makes the image look sharp. In general, the HMD may receive the encoded pixel data from the host computer and display an image on the HMD's display panel(s) based on the received pixel data. As will be described in more detail below, the HMD may reconstruct and/or modify the pixel data, as needed, before rendering the final images so that the user perceives the content as it was intended to be perceived consistent with the user's head orientation and gaze.

As noted above, limited data rates of existing communications protocols (e.g., wireless protocols) present challenges in distributed display systems, especially in distributed, wireless VR gaming system while playing a graphics intensive video game. For instance, depending on the wireless protocol, a typical data rate for transporting data wirelessly from a host computer to a display device may range from 50 to 300 megabits per second (Mbps). Consider an example where the available data rate is on the order of 100 Mbps. In this example, a video game executing on the host computer may be rendering frames at a resolution of 2.5 k pixels (i.e., an image with 2500×2500 pixels) per eye, which equates to 12,500,000 pixels across two images, one image per eye. At 3 bytes per pixel, this means that the amount of data to transport the images for a given frame is on the order of 300 megabits. In a 120 hertz (Hz) VR gaming system, in order to transmit all of the image data in a timely manner, the host computer would therefore have to transmit pixel data at a rate of 36,000 Mbps (or 36 gigabits per second (Gbps)). However, this amount of pixel data cannot be transported fast enough in a distributed system that is constrained by a 100 Mbps data rate.

Described herein are techniques, devices, and systems for implementing a dual detail encoding scheme that allows for transporting pixel data, among other data, from a host computer to a display device in a timely manner and without compromising the perceived fidelity of the imagery that is displayed on the display device. An example process for streaming pixel data from a host computer to a display device may include rendering, by a graphics-rendering application executing on the host computer, a frame for a scene at a first resolution, generating a 2D array of pixels for the frame, encoding the 2D array of pixels to obtain encoded pixel data for the frame, and transmitting the encoded pixel data to the display device. Particularly, the 2D array of pixels that is encoded in the aforementioned process provides two levels of detail per eye. That is, the 2D array of pixels comprises, for each eye, a copy of the frame downscaled to a second resolution less than the first resolution, and a copy of a subregion of the scene. And because the frame includes the subregion, the 2D array of pixels comprises, for each eye, two copies of the subregion (one being a copy of the subregion itself, and another being included in the copy of the downscaled frame). In some examples, the pixels representing the copies of the subregion of the scene correspond one-to-one with original pixels of the frame, which allows for presenting images via the display device where the subregions are rendered with the same or similar quality as they were rendered by the application in the original frame. Furthermore, by transmitting copies of the subregion (the subregion having fewer pixels than the full image) and copies of the downscaled frame, the host computer is able to transmit the reduced amount of pixel data at a data rate that is commonly available in distributed display systems, including wireless systems. Hence, the dual detail encoding techniques described herein allow the host computer to send a much smaller amount of data (i.e., the 2D array of pixels), and the display device is configured to reconstruct the images from the 2D array of pixels such that the user of the display device perceives the presented imagery as high quality imagery (e.g., images that look sharp, crisp, etc.).

An example process for displaying an image based on pixel data received from a host computer may include receiving, from a host computer, encoded pixel data for a frame for a scene, decoding the encoded pixel data to obtain a 2D array of pixels for the frame, enlarging a first copy of the frame based at least in part on first pixels of the 2D array of pixels to obtain a first enlarged copy of the frame, and enlarging a second copy of the frame based at least in part on second pixels of the 2D array of pixels to obtain a second enlarged copy of the frame. The process may continue by generating a first image based at least in part on the first enlarged copy of the frame and third pixels of the 2D array of pixels that represent a first copy of a subregion of the scene, wherein a subset of the third pixels at a periphery of the subregion are blended in the first image, and generating a second image based at least in part on the second enlarged copy of the frame and fourth pixels of the 2D array of pixels that represent a second copy of the subregion, wherein a subset of the fourth pixels at the periphery of the subregion are blended in the second image. The first image and the second image can then be presented on respective display panels of the display device, such as left and right display panels, or on a single display panel.

By reducing the amount of data that is to be transmitted from a host computer to a display device using the dual detail encoding techniques described herein, a distributed display system can stream pixel data in a timely manner for display of corresponding imagery on the display device, and the user perceives the imagery as high-fidelity imagery on the display device. For example, even though the portion of the displayed images outside of the subregion may be presented with relatively low quality (e.g., low resolution), the user's gaze is likely to be directed at the subregion of the scene where the image quality is relatively higher, making it seem, to the user, as though the images are of high quality. In other words, distributed display systems can implement the dual detail encoding techniques described herein in order to avoid transmitting pixel data for areas of the scene that the user is unlikely to look at when the corresponding images are presented, yet the user does not perceive the image to be of lower quality than the originally-rendered frame.

Also disclosed herein are devices, systems, and non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications, mixed reality (MR) applications), and/or non-gaming applications, such as industrial machine applications, defense applications, robotics applications, and the like.

FIG. 1 is a diagram illustrating an example distributed display system 100 including a host computer(s) 102 and a display device(s) in the form of a HMD 104, in accordance with embodiments disclosed herein. FIG. 1 depicts the HMD 104 being worn by a user 106. FIG. 1 also depicts example implementations of a host computer 102 in the form of a laptop 102(1) carried in a backpack, for example, or a personal computer (PC) 102(N), which may be situated in the user's 106 household, for example. It is to be appreciated, however, that these exemplary types of host computers 102 are non-limiting to the present disclosure. For example, the host computer 102 can be implemented as any type and/or any number of computing devices, including, without limitation, a PC, a laptop computer, a desktop computer, a portable digital assistant (PDA), a mobile phone, tablet computer, a set-top box, a game console, a portable game device, a server computer, a wearable computer (e.g., a smart watch, etc.), or any other electronic device that can transmit data to, and receive data from, other devices. The host computer 102 may be collocated in the same environment as the HMD 104, such as a household of the user 106 wearing the HMD 104. Alternatively, the host computer 102 may be remotely located with respect to the HMD 104, such as a host computer 102 in the form of a server computer that is located in a remote geographical location with respect to the geographical location of the HMD 104. In a remote host computer 102 implementation, the host computer 102 may be communicatively coupled to the HMD 104 via a wide-area network, such as the Internet. In a local host computer 102 implementation, the host computer 102 may be collocated in an environment (e.g., a household) with the HMD 104, whereby the host computer 102 and the HMD 104 may be communicatively coupled together either directly or over a local area network (LAN) via intermediary network devices.

It is also to be appreciated that the exemplary HMD 104 is but one example type of display device that can be implemented with the techniques and systems described herein. For example, other types and/or numbers of display devices can be utilized in lieu of, or in conjunction with, the HMD 104 described in many of the examples herein. Accordingly, the HMD 104 may be referred to herein more generally as a "display device," and it is to be appreciated that other suitable types of display devices may exchange data with the host computer 102. Such display devices may include, without limitation, a television, a portable game device with a display, a laptop computer, a desktop computer, a PDA, a mobile phone, a tablet computer, a wearable computer (e.g., a smart watch, etc.), or any other electronic device that can transmit/receive data as well as display imagery on a display screen(s) or panel(s).

In the example of FIG. 1, the HMD 104 and the host computer 102 are communicatively coupled together and are configured to work together in a collaborative fashion to render a given frame and present a corresponding image(s) on a display panel(s) 108 of the HMD 104. This collaboration iterates over a series of frames to render a series of images (e.g., images for a VR game) on the HMD 104. In the illustrated implementation, the HMD 104 includes one or more processors 110 and memory 112 (e.g., computer-readable media 112). In some implementations, the processors(s) 110 may include a central processing unit (CPU)(s), a graphics processing unit (GPU)(s) 114, both CPU(s) and GPU(s) 114, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), etc. Additionally, each of the processor(s) 110 may possess its own local memory, which also may store program modules, program data, and/or one or more operating systems. In some embodiments, each of the processor(s) 110 may possess its own encoder and/or decoder hardware.

The memory 112 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disk ROM (CD-ROM) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The memory 112 may be implemented as computer-readable storage media (CRSM), which may be any available physical media accessible by the processor(s) 110 to execute instructions stored on the memory 112. In one basic implementation, CRSM may include RAM and Flash memory. In other implementations, CRSM may include, but is not limited to, ROM, EEPROM, or any other tangible medium which can be used to store the desired information and which can be accessed by the processor(s) 110.

In general, the HMD 104 may include logic (e.g., software, hardware, and/or firmware, etc.) that is configured to implement the techniques, functionality, and/or operations described herein. The computer-readable media 112 can include various modules, such as instruction, datastores, and so forth, which may be configured to execute on the processor(s) 110 for carrying out the techniques, functionality, and/or operations described herein. An example functional module in the form of a compositor 116 is shown as being stored in the computer-readable media 112 and executable on the processor(s) 110, although the same functionality may alternatively be implemented in hardware, firmware, or as a system on a chip (SOC), and/or other logic. Furthermore, additional or different functional modules may be stored in the computer-readable media 112 and executable on the processor(s) 110. The compositor 116 is configured to modify pixels (or pixel data) to generate an image(s) and to output the modified pixel data representing the image(s) to a frame buffer (e.g., a stereo frame buffer) so that the image(s) can be presented on the display panel(s) 108 of the HMD 104. For example, the compositor 116 is configured to reconstruct the frame using the pixel data received from the host computer 102, as will be described in more detail below. Furthermore, the compositor 116 may apply other modifications to the pixel data before outputting the final pixel data to the frame buffer. For example, the compositor 116 may be configured to make adjustments for geometric distortion, chromatic aberration, re-projection, and the like. At least some of these adjustments may compensate for the distortion of the near-to-eye optical subsystem (e.g., lenses and other optics) of the HMD 104, with other adjustments, such as re-projection adjustments, may compensate for slight inaccuracies in an original pose prediction of the HMD 104 and/or to compensate for the application failing to make frame rate and/or to compensate for a late-arriving data packet(s). For example, a re-projected frame can be generated using pixel data from an application-rendered frame by transforming (e.g., through rotation and re-projection calculations) the application-rendered frame in a way that accounts for an updated prediction of the pose of the HMD 104, which may be more accurate than the original pose prediction. Accordingly, the modified pixel data obtained from applying the re-projection adjustments (and/or other adjustments) may be used to present an image(s) on the display panel(s) 108 of the HMD 104 for the given frame, and this process may iterate over the series of frames.

The HMD 104 may further include a head tracking system 118 that generates head tracking data. The head tracking system 118 may leverage one or more sensors (e.g., infrared (IR) light sensors mounted on the HMD 104) and one or more tracking beacon(s) (e.g., IR light emitters collocated in the environment with the HMD 104) to track head motion or movement, including head rotation, of the user 106. This example head tracking system 118 is non-limiting, and other types of head tracking systems 118 (e.g., camera-based, inertial measurement unit (IMU)-based, etc.) can be utilized.

The HMD 104 may further include an eye tracking system 120 that generates eye tracking data. The eye tracking system 120 may include, without limitation, a camera or other optical sensor inside the HMD 104 to capture image data (or information) of a user's eyes, and the eye tracking system 120 may use the captured data/information to determine motion vectors, interpupillary distance, interocular distance, a 3D position of each eye relative to HMD 104, including a magnitude of torsion and rotation (i.e., roll, pitch, and yaw) and gaze directions for each eye. In one example, infrared light is emitted within HMD 104 and reflected from each eye. The reflected light is received or detected by a camera of the eye tracking system 120 and analyzed to extract eye rotation from changes in the infrared light reflected by each eye. Many methods for tracking the eyes of a user 106 can be used by the eye tracking system 120.

FIG. 1 depicts the HMD 104 sending data 122 to the host computer 102. This data 122 can include, without limitation, the head tracking data and/or the eye tracking data, as described above. Furthermore, the data 122 can be transmitted via a communications interface(s) 124 of the HMD 104 during runtime, as frames are being rendered at the host computer 102 and as corresponding imagery is being presented at the HMD 104. The communications interface(s) 124 of the HMD 104 may include wired and/or wireless components (e.g., chips, ports, etc.) to facilitate wired and/or wireless data transmission/reception to/from the host computer 102, either directly or via one or more intermediate devices, such as a wireless access point (WAP). For example, the communications interface(s) 124 may include a wireless network interface controller. The communications interface(s) 124 may conform to the Institute of Electrical and Electronics Engineers (IEEE) 502.11 standard(s) and may include a radio (e.g., having one or more antennas) to facilitate a wireless connection with the host computer 102 and/or other devices and for transmitting and receiving data packets using radio frequency (RF) communication. The communications interface(s) 124 may be built into the HMD 104 or coupled to the HMD 104 (e.g., wireless adapter, peripheral, accessory, etc.) to adapt the HMD 104 to operate as an 502.11-compliant wireless communication device. In some embodiments communications interface(s) 124 may comprise a Universal Serial Bus (USB) wireless adapter (e.g., a USB dongle) that is plugged into a USB port on the HMD 104. In other embodiments, the communications interface(s) 124 may be coupled to electrical components of the HMD 104 via a Peripheral Component Interconnect (PCI) interface. It is to be appreciated that the communications interface(s) 124 may further include one or more physical ports to facilitate a wired connection (e.g., via a cable) with the host computer 102 and/or another device(s) (e.g., a plug-in network device that communicates with other wireless networks).

Turning to the host computer 102, the host computer 102 is shown as including one or more processors 126 and memory 128 (e.g., computer-readable media 128). In some implementations, the processors(s) 126 may include a CPU(s), a GPU(s) 130, both CPU(s) and GPU(s) 130, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include FPGAs, ASICs, ASSPs, SOCs, etc. Additionally, each of the processor(s) 126 may possess its own local memory, which also may store program modules, program data, and/or one or more operating systems. In some embodiments, each of the processor(s) 126 may possess its own encoder and/or decoder hardware. Compared to the GPU(s) 114 of the HMD 104, the GPU(s) 130 of the host computer 102 may be a higher-performance GPU(s) with higher computing capacity. For example, the computing capacity of the GPU(s) 114 of the HMD 104 may be insufficient for processing graphics for certain graphics intensive video games, which is why the system 100 is distributed; to leverage the relatively higher computing capacity of the host computer 102 for executing a graphics intensive video game.

The memory 128 of the host computer 102 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM or other optical storage, magnetic cassettes, magnetic tape, magnetic disk storage or other magnetic storage devices, RAID storage systems, or any other medium which can be used to store the desired information and which can be accessed by a computing device. The memory 128 may be implemented as CRSM, which may be any available physical media accessible by the processor(s) 126 to execute instructions stored on the memory 128. In one basic implementation, CRSM may include RAM and Flash memory. In other implementations, CRSM may include, but is not limited to, ROM, EEPROM, or any other tangible medium which can be used to store the desired information and which can be accessed by the processor(s) 126.

In general, the host computer 102 may include logic (e.g., software, hardware, and/or firmware, etc.) that is configured to implement the techniques, functionality, and/or operations described herein. The computer-readable media 128 can include various modules, such as instructions, datastores, and so forth, which may be configured to execute on the processor(s) 126 for carrying out the techniques, functionality, and/or operations described herein. An example functional module in the form of an application(s) 132 is shown in FIG. 1. The application(s) 132 may represent a graphics-rendering application, or a graphics-based application, such as a video game(s) 132(1). In some examples, the host computer 102 may include a client application or other software (e.g., a video game client) that is configured to execute the one or more applications 132. For example, the host computer 102 may have installed thereon gaming software to play video games 132(1).

In general, a communications interface(s) 134 of the host computer 102 may include wired and/or wireless components (e.g., chips, ports, etc.) to facilitate wired and/or wireless data transmission/reception to/from the HMD 104 (or any other type of display device), either directly or via one or more intermediate devices, such as a WAP. In some examples, the communications interface(s) 134 may include a wireless network interface controller. The communications interface(s) 134 may conform to the IEEE 502.11 standard(s) and may include a radio (e.g., having one or more antennas) to facilitate a wireless connection with the HMD 104 and/or other devices and for transmitting and receiving data packets using RF communication. The communications interface(s) 134 may be built into or coupled to the host computer 102 (e.g., a wireless adapter, peripheral, accessory, etc.) to adapt the host computer 102 to operate as an 502.11-compliant wireless communication device. In some embodiments, the communications interface(s) 134 may comprise a USB wireless adapter (e.g., a USB dongle) that is plugged into a USB port on the host computer 102. In other embodiments, the communications interface(s) 134 may be coupled to electrical components of the host computer 102 via a PCI interface. It is to be appreciated that the communications interface(s) 134 may further include one or more physical ports to facilitate a wired connection (e.g., via a cable) with the HMD 104 and/or another device(s) (e.g., a plug-in network device that communicates with other wireless networks).

In some embodiments, the HMD 104 may represent a VR headset for use in VR systems, such as for use with a VR gaming system, in which case the video game 132(1) may represent a VR video game 132(1). However, the HMD 104 may additionally, or alternatively, be implemented as an AR headset for use in AR applications, a MR headset for use in MR applications, or a headset that is usable for VR, AR, and/or MR applications that are not game-related (e.g., industrial applications). In AR, a user 106 sees virtual objects overlaid on a real-world environment, whereas, in VR, the user 106 does not typically see a real-world environment, but is fully immersed in a virtual environment, as perceived via the display panel(s) 108 and the optics (e.g., lenses) of the HMD 104. It is to be appreciated that, in some VR systems, pass-through imagery of the real-world environment of the user 106 may be displayed in conjunction with virtual imagery to create an augmented VR environment in a VR system, whereby the VR environment is augmented with real-world imagery (e.g., overlaid on a virtual world). Examples described herein pertain primarily to a VR-based HMD 104, but it is to be appreciated that the HMD 104 is not limited to implementation in VR applications.

In general, and as mentioned above, the application(s) 132 executing on the host computer 102 can represent graphics-based application(s) 132 (e.g., a video game 132(1)). An application 132 is configured to generate pixel data for a series of frames, and the pixel data is ultimately used to present corresponding images on the display panel(s) 108 of the HMD 104. In a system 100 with a HMD 104, a component of the host computer 102 may determine a predicted "illumination time" for the frame. This predicted "illumination time" for the frame represents a time at which light emitting elements of the display panel(s) 108 of the HMD 104 will illuminate for the frame. This prediction can account for, among other things, the estimated time it will take to transmit data over a wireless communication link between the host computer 102 and the HMD 104, as well as a predicted render time of the application 132 and/or a known scan-out time of the pixels from the frame buffer(s). In some embodiments, the prediction may be different for a wireless communication link than it is for a wired communication link. In some embodiments, an illumination time can be predicted as an amount of time in the future (e.g., about 20-40 milliseconds in the future), and the amount of time may vary depending on the connection type (e.g., wired connection verses wireless connection).

The host computer 102 may receive, from the HMD 104, the data 122 (e.g., head tracking data, eye tracking data, etc.). The data 122 may be generated and/or sent at any suitable frequency, such as a frequency corresponding to the target frame rate and/or the refresh rate of the HMD 104, or a different (e.g., faster) frequency, such as 360 hertz (Hz) (or 1 sensor reading every 2.7 milliseconds). A component of the host computer 102 may determine a predicted pose that the HMD 104 will be in at the predicted illumination time based at least in part on head tracking data included in the data 122. Pose data indicative of the predicted pose may be provided to the executing application 132 for rendering the frame (e.g., generating pixel data for the frame) based on the predicted pose, and the application 132 may output pixel data associated with the frame. This pixel data may correspond to an array of pixels of the display panel(s) 108 of the HMD 104. For example, the pixel data that is output by the application 132 based on the pose data may include a two-dimensional array of per-pixel values (e.g., color values) for the array of pixels on the display panel(s) 108 of the HMD 104. In an illustrative example, the HMD 104 may include a stereo pair of display panels 108, and the application 132 may render a frame for a scene at a first resolution. For instance, the first resolution at which the frame for each display panel 108 is rendered may be an array of 2500×2500 pixels. In this illustrative example, the pixel data for an individual frame for a display panel 108 may include 2500×2500 pixel values (or 12,500,000 pixel values for both display panels 108). In some embodiments, the pixel data may include data for each pixel that is represented by a single set of color and alpha values (e.g., one color value for a red channel, one color value for a green channel, one color value for a blue channel, and one or more values for one or more alpha channels).

It is to be appreciated that logic of the host computer 102 may also generate extra data besides (or, in addition to) the pixel data that is generated for presenting imagery on the display panel(s) 108 of the HMD 104, and at least some of this extra data may be sent to the HMD 104 as well. In some embodiments, the extra data can be packaged with the pixel data and sent to the HMD 104 as data 136. At least some of the extra data packaged in the data 136 can be used by logic of the HMD 104 for purposes of presenting an image(s) corresponding to the frame on the display panel(s) 108 of the HMD 104. The extra data can include, without limitation, the pose data indicative of the predicted pose of the HMD 104, depth data, motion vector data, parallax occlusion data, extra pixel data, and/or audio data. For example, in addition to generating the pixel data corresponding to the to-be-rendered image, the application 132 may also generate depth data (e.g., Z-buffer data) for the frame and/or extra pixel data (sometimes referred to herein as "out-of-bounds pixel data" or "additional pixel data"). Additionally, or alternatively, motion vector data based at least in part on the head tracking data received from the HMD 104 may be generated and transmitted to the HMD 104 for aiding in the processing of the pixel data on the HMD 104. For example, motion vector data can be generated based on a comparison of head tracking data generated at two different points in time (e.g., a comparison of head tracking data separated by a few milliseconds). Logic of the HMD 104 can utilize some or all of the extra data for purposes of modifying the pixel data to correct for errors in the pose prediction made ahead of time at the host computer 102. For example, adjustments made by the HMD 104 may include, without limitation, adjustments for geometric distortion, chromatic aberration, re-projection, and the like.

Before the pixel data is sent to the HMD 104, the host computer 102 may implement the dual detail encoding technique disclosed herein, which allows for timely transmitting the data 136 to the HMD 104 under data rate constraints on the order of 100 Mbps. As depicted in FIG. 1, the host computer 102 may generate a 2D array 138 of pixels for the frame with a reduced number of pixels, as compared to the number of pixels of the application-rendered frame (which may be on the order of 12.5 million pixels, as described in the example above). The 2D array 138 of pixels may include first pixels representing a first copy of the frame 140(1) downscaled to a second resolution less than the first resolution at which the application 132 rendered the frame, and second pixels representing a second copy of the frame 140(2) downscaled to the second resolution. "Downscale," as used herein, means reducing the resolution, and is sometimes referred to as "down-res," or "down-convert." In an illustrative example, each copy of the frame 140(1), 140(2) for an individual display panel 108 of the HMD 104 may be downscaled from a first resolution of, say, 2500×2500 pixels to a second resolution of, say, 500×500 pixels. This is exemplary, and any suitable amount or degree of downscaling may be implemented. The 2D array 138 of pixels may further include third pixels representing a first copy of a subregion 142(1) of the scene, and fourth pixels representing a second copy of the subregion 142(2). The subregion may be a region of the scene for the given frame.

In some examples, the subregion may be a predetermined (or fixed) subregion. In VR, the user 106 is looking straight forward most of the time, which means that most of the time, the user 106 is looking at a very small fraction of the images presented on a near-eye display, such as a HMD 104. This fraction of the images corresponds to a central subregion of the scene, give or take 10 to 30 degrees off center. In any case, the user 106 seldom, if ever, looks at the periphery of the scene (e.g., the corners and far edges of the imagery), and, in fact, the user's eyes may be incapable of viewing the periphery of the scene in a near-eye display other than through their peripheral vision because the angles are too extreme in a near-eye display. Accordingly, the subregion of the scene may be predetermined, in some examples, and the predetermined subregion may correspond to a central subregion of the scene. That is, in some examples, for each frame that is rendered, the 2D array 138 of pixels may include pixels that represent copies of a subregion 142(1), 142(1) of the scene that is predetermined as the central subregion of the scene, such that the subregion is the same portion of the scene for every frame and for every 2D array 138 of pixels that is generated and transported, although the scenes themselves vary frame-to-frame.

In some examples, the subregion may be determined dynamically for individual frames. For example, the subregion may be determined for an individual frame based at least in part on eye tracking data generated by the eye tracking system 120 of the HMD 104 and received by the host computer 102 in the data 122 at runtime. The eye tracking data received by the host computer 102 may be indicative of a predicted location on a display panel(s) 108 of the HMD 104 where the user 106 will be looking at a time when an image(s) is presented on the display panel(s) 108 based on the encoded pixel data transmitted to the HMD 104 in the data 136. In some examples, the host computer 102 makes the prediction of where the user 106 will be looking when the imagery is presented. In some examples, the eye tracking system 120 makes the prediction and transmits data representing the prediction to the host computer 102. An advantage of the host computer 102 making the prediction is that the prediction can be made closer in time to when the imagery is presented at the HMD 104, and/or the relatively higher computing capacity of the host computer 102 can be leveraged for making the prediction. In any case, in examples where the subregion is determined dynamically (e.g., on-the-fly) frame-by-frame, the position of the subregion may change frame-to-frame such that when the user's 106 gaze steers to the left, the subregion is selected as a subregion of the scene that is left-of-center, or when the user's 106 gaze steers upward, the subregion is selected as a subregion of the scene that is above the center of the scene. In other words, eye tracking can be used to "steer" the more-detailed (e.g., higher-resolution) inner target, which is referred to herein as the "subregion" of the scene. In this way, the more-detailed subregion can be presented in imagery on the display panel(s) 108 at the location where the user 106 is looking so that the user 106 is looking directly at the more-detailed (or higher-quality) portion of the imagery in the scene, and the less-detailed (or lower-quality) imagery is viewed, if at all, through the user's peripheral vision.

The copies of the subregion 142(1), 142(2) may be of any suitable shape. The example of FIG. 1 shows the copies of the subregion 142(1), 142(2) as being rectangular, but the copies of the subregion 142(1), 142(2) can be of a different shape, such as elliptical, square-shaped, square-shaped with rounded corners (e.g., "squircle-shaped"), triangular, pentagonal, or any other suitable polygonal shape.

In some examples, the pixels of the respective copies of the subregion 142(1), 142(2) in the 2D array 138 may correspond one-to-one with original pixels of the frame that represent the subregion. In other words, the respective copies of the subregion 142(1), 142(2) in the 2D array 138 may be exact copies that have not been resampled (e.g., downscaled) in any manner. This means that each pixel in the subregions of the scene for each image that the application-rendered for a frame may be copied over as-is in the respective copies of the subregion 142(1), 142(2) in the 2D array 138. In some examples, the copies of the subregions 142(1), 142(2) in the 2D array 138 have been downscaled to a reduced resolution (i.e., a resolution that is less than the resolution at which the application 132 rendered the subregions in the given frame). In these examples, the copies of the subregions 142(1), 142(2) in the 2D array 138 may be downscaled with idealized sampling, such as by downscaling the subregion in accordance with an integer ratio (e.g., 1:2). This idealized sampling for the subregion may allow for relatively high-quality resampling when the copies of the subregion are enlarged at the HMD 104. In other words, downscaling the copies of the subregion 142(1), 142(2) in accordance with an integer ratio may mitigate artifacts (e.g., aliasing, blurring, etc.) in the corresponding portions of the imagery presented at the HMD 104, whereas downscaling the copies of the subregion 142(1), 142(2) by 10%, 15%, or the like may cause such artifacts to be exhibited in the resulting imagery at the HMD 104.

The copies of the subregion 142(1), 142(2) may be of any suitable size. A tradeoff of making the subregion as large as possible (so as to make the relatively low-quality portions of the imagery outside of the subregion less conspicuous) is that more data is required to transport the pixels for a larger subregion. Accordingly, because data rate constraints may vary by implementation, the optimal size for the subregion can vary, and there may be practical limits to increasing the size of the subregion. Furthermore, the application 132 may, in some examples, vary the resolution at which the frames are rendered frame-to-frame. In other words, the application 132 may render a first frame in a series of frames at a first resolution, and the application 132 may subsequently render a second frame (e.g., the next frame) of the series of frames at a second resolution different than the first resolution. This means that the percentage of the scene (or the image(s)) that corresponds to the subregion may vary frame-to-frame, even if the size of the subregion is fixed at M×N pixels. In the running example, the subregion may be a subregion of 800×800 pixels. Accordingly, in the example of FIG. 1, the 2D array 138 of pixels may be an array of, say, 800×3200 pixels (or 2,560,000 pixel values for both display panels 108). Another example is a 2D array 138 of 960×3840 pixels (or 3,686,400 pixel values for both display panels 108). In other words, the size of the render target for the 2D array 138 can have an aspect ratio of 4:1. Thus, generating the 2D array 138 of pixels results in far fewer pixels that are ultimately transmitted to the HMD 104, as compared to the 12,500,000 pixel values for the frame rendered by the application 132 at the first resolution.

The host computer 102 may encode the 2D array 138 of pixels to obtain encoded pixel data for the frame, and the host computer 102 may transmit the encoded pixel data to the HMD 104 as part of the data 136 that is transmitted to the HMD 104, as shown in FIG. 1. In some examples, the host computer 102 may utilize encoder hardware of the GPU(s) 130 to encode the 2D array 138 of pixels. Furthermore, the data 136, including the encoded pixel data (and possibly extra data), is transmitted to the HMD 104 during runtime. In this manner, the host computer 102 is configured to encode and transport smaller images, as compared to the application-rendered images, and these smaller images include redundant data and provide varying levels of detail per eye of the user 106 so that the HMD 104 is able to reconstruct images that are presented on the display panels 108 of the HMD 104 in such a way that the user 106 perceives them to be high-fidelity images, even though some of the pixel data for a given frame was sacrificed (e.g., not transmitted) by downscaling the copies of the frame 140(1), 140(2) in the 2D array 138 of pixels, as described above.

At the HMD 104, upon receiving the data 136, including the encoded pixel data (and possibly extra data), the HMD 104 may decode the encoded pixel data to obtain the 2D array 138 of pixels for the frame. In some examples, the HMD 104 may utilize decoder hardware of the GPU(s) 114 to decode the encoded pixel data received from the host computer 102. The compositor 116 of the HMD 104 may then modify the pixels of the 2D array 138 in order to reconstruct the image(s) for the frame, as well as to make adjustments for geometric distortion, chromatic aberration, re-projection, and the like.

Figure 2:
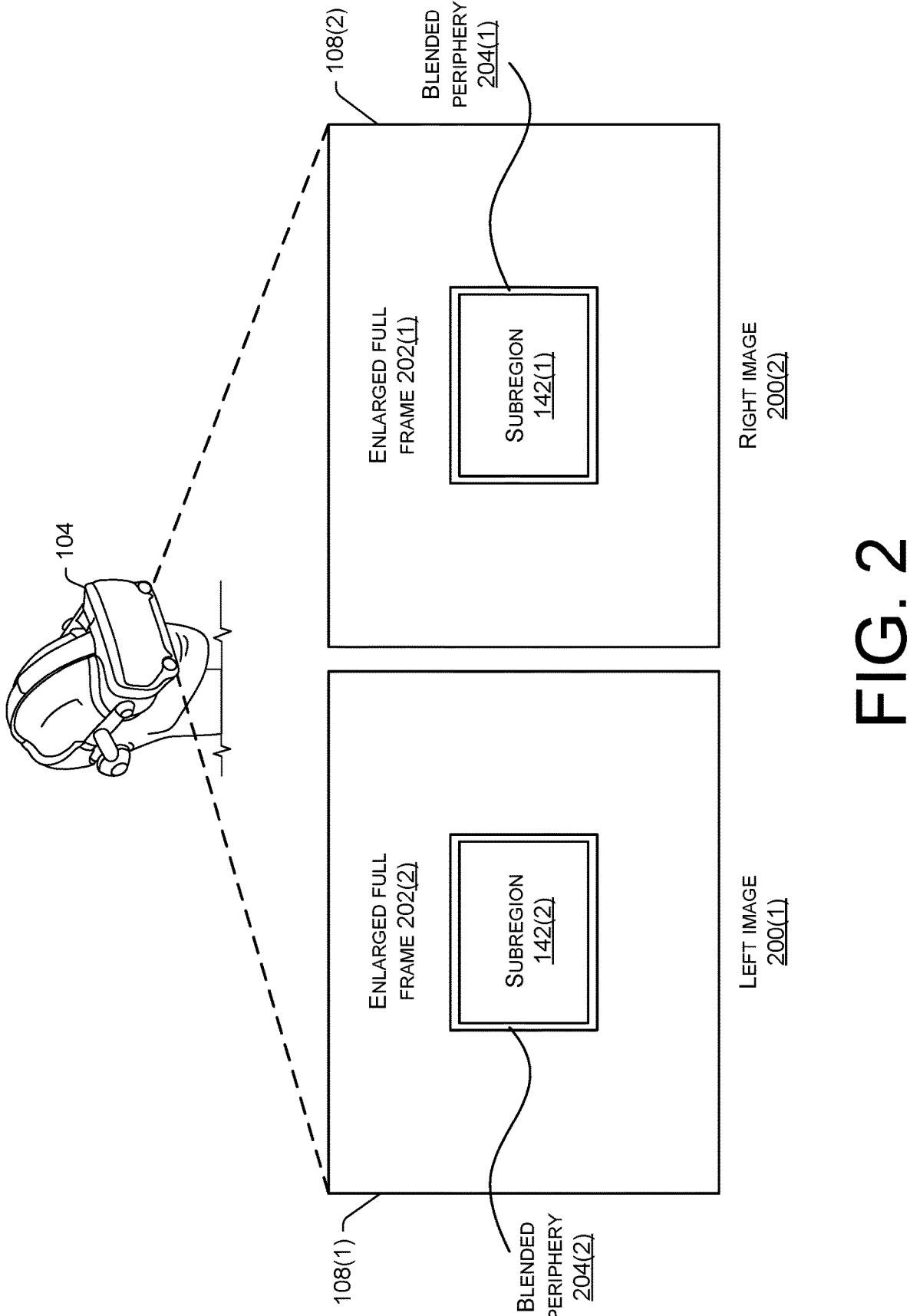
FIG. 2 is a diagram illustrating images that are presented on display panels of the HMD, in accordance with embodiments disclosed herein.

FIG. 2 is a diagram illustrating images 200(1) and 200(2) that are presented on display panels 108(1) and 108(2), respectively, of the HMD 104, in accordance with embodiments disclosed herein. As mentioned above, the HMD 104 is configured to decode the encoded pixel data received from the host computer 102 to obtain the 2D array 138 of pixels for the frame shown in FIG. 1, and the compositor 116 modifies the pixels of the 2D array 138 in order to reconstruct the image(s) 200(1), 200(2) for the frame. To reconstruct the right image 200(2) (e.g., for a right display panel 108(2) of a stereo pair of display panels 108), the compositor 116 may enlarge the first copy of the frame 140(1) based at least in part on the corresponding pixels of the 2D array 138 to obtain a first enlarged copy of the frame 202(1), and may generate the right image 200(2) based at least in part on the first enlarged copy of the frame 202(1) and pixels of the 2D array 138 that represent the first copy of a subregion 142(1) of the scene, wherein a subset of the pixels at a periphery 204(1) of the subregion are blended in the right image 200(2). To reconstruct a left image of the two images, the compositor 116 may enlarge the second copy of the frame 140(2) based at least in part on the corresponding pixels of the 2D array 138 to obtain a second enlarged copy of the frame 202(2), and may generate the left image 200(1) based at least in part on the second enlarged copy of the frame 202(2) and pixels of the 2D array 138 that represent the second copy of the subregion 142(2), wherein a subset of the pixels at a periphery 204(2) of the subregion are blended in the left image 200(1). The left image 200(1) and the right image 200(2) can then be presented on respective display panels 108(1) and 108(2) of the HMD 104.

Because the copies of the frame 140(1), 140(2) in the 2D array 138 of pixels were downscaled, the enlarged copies of the frame 202(1), 202(2) may appear blurry in the displayed images 200(1), 200(2). In particular, the areas of the images 200(1), 200(2) outside of the respective subregions 142(1), 142(2), if looked at directly, would appear blurry, but since the user's 106 eyes are likely to be looking directly at the subregions 142(1), 142(2), the relatively low-quality imagery outside of the subregions 142(1), 142(2) is likely to go unnoticed due to those portions of the imagery being in the user's 106 peripheral vision. By utilizing eye tracking to determine the subregion dynamically, as described above, the instances of the user 106 noticing the relatively low-quality imagery outside of the subregions 142(1), 142(2) can be reduced, but even with a predetermined (or fixed) subregion, it is difficult for the average user 106 to notice any degradation in image quality due to the dual detail encoding scheme disclosed herein.

The blended peripheries 204(1), 204(2) render the boundary between the subregions 142(1), 142(2) and the enlarged copies of the frame 202(1), 202(2) inconspicuous. That is, without blending the peripheries 204(1), 204(2) of the subregions, the user 106 may notice distinct boundaries (or borders) around the subregions 142(1), 142(2) in the presented images 200(1), 200(2). The blending at the peripheries 204(1), 204(2) of the subregions 142(1), 142(2) may include fading between overlapping pixel data of the two areas of each image 200(1), 200(2). For example, the blending may involve interpolating between a pixel value of the subregions 142(1), 142(2) and an overlapping pixel value of the enlarged copies of the frame 202(1), 202(2), where the interpolation is closer to the pixel values of the subregions 142(1), 142(2) at points that are closer to the centers of the respective images 200(1), 200(2), and the interpolation gradually changes for points that are farther from the image centers to be closer to the pixel value of the enlarged copies of the frame 202(1), 202(2) at points that are farther from the image centers. Certain shapes of the subregions 142(1), 142(2) may result in more or less blending at the peripheries 204(1), 204(2). The end result of the image reconstruction for each image 200 is an image 200 with three areas including a sharp, crisp subregion 142, a somewhat blurry area outside of the subregion 142, and an area between these two areas that is blended to make the image 200 look smooth (i.e., the user 106 can't tell that there are three distinct areas of the image 200).

Figure 3A:
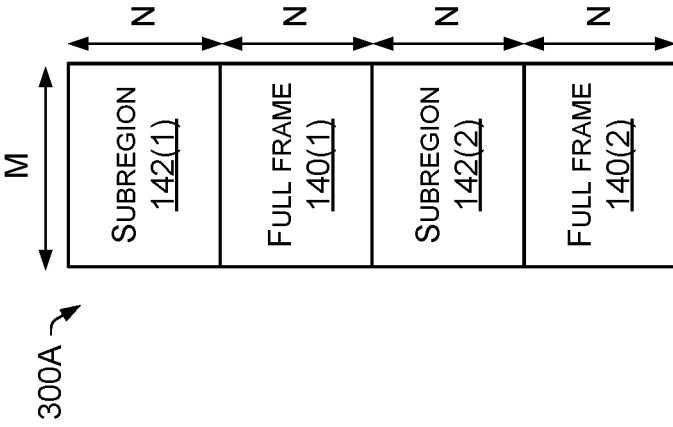
FIG. 3A illustrates an example packing layout for a two-dimensional (2D) array of pixels, in accordance with embodiments disclosed herein.

FIG. 3A illustrates a first example packing layout 300A for the 2D array 138 of pixels described above, while FIG. 3B illustrates a second example packing layout 300B for the 2D array 138 of pixels. These are merely exemplary packing layouts 300 and others can be implemented. In the example of FIG. 3A, the packing layout 300A represents a vertical packing layout 300A having pixels representing a first copy of the subregion 142(1) of the scene at a top of the 2D array 138 of pixels, followed by pixels representing a first copy of the frame 140(1) (downscaled to a reduced resolution) below the pixels representing the first copy of the subregion 142(1), followed by pixels representing a second copy of the subregion 142(2) below the pixels representing the first copy of the frame 140(1), and pixels representing a second copy of the frame 140(2) (downscaled to a reduced resolution) at a bottom of the 2D array 138 of pixels. This vertical packing layout 300A may allow the host computer 102 to send packets carrying some of the encoded pixel data while other pixel data is still being encoded. For example, the host computer 102, using the encoder of the GPU 130, may encode the pixels of the first copy of the subregion 142(1) and may start transmitting the encoded pixel data for the first copy of the subregion 142(1) while the pixels representing the first copy of the frame 140(1) are being encoded. This can reduce the latency of transmitting the encoded pixel data, as compared to waiting for the entire 2D array 138 of pixels to be encoded before the encoded pixel data is transmitted to the HMD 104. Furthermore, it is to be appreciated that the ordering of the four sub-arrays of the 2D array 138 shown in FIG. 3A is exemplary. For instance, there can be as many as 24 different vertical packing layouts with 24 different ordering permutations for the four sub-arrays.

FIG. 3A also illustrates that the dimensions of each of the four groups of pixels in the 2D array 138 of pixels as being M×N pixels. In other words, the first copy of the subregion 142(1) is a rectangle with M pixels in a horizontal dimension and N pixels in a vertical dimension. As shown in FIG. 3A, the first copy of the frame 140(1) is downscaled to a rectangle with M pixels in the horizontal dimension and N pixels in the vertical dimension. The is also the case for the second copy of the subregion 142(2) and the second copy of the frame 140(2). In some examples, M is equal to N. In some examples, M is different than N. In an example where M is equal to N, M and N may be 500 pixels, but this is merely one example dimension that can be implemented. Accordingly, and as mentioned above, the 2D array 138 of pixels may be 500 by 3200 pixels, which is far fewer pixels than the application-rendered frame.

Figure 3B:
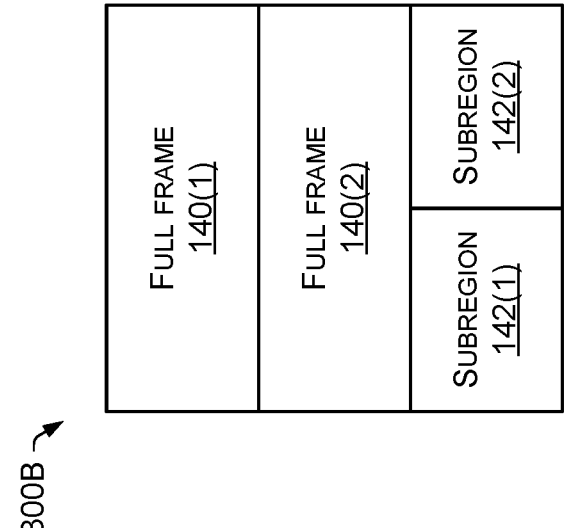
FIG. 3B illustrates another example packing layout for a 2D array of pixels, in accordance with embodiments disclosed herein.

The packing layout 300B shown in FIG. 3B is another possible layout for the groups of pixels in the 2D array 138 of pixels. The example packing layout 300B has pixels representing the first copy of the frame 140(1) (downscaled to a reduced resolution) at a top of the 2D array 138 of pixels, followed by pixels representing a second copy of the frame 140(2) (downscaled to a reduced resolution) below the pixels representing the first copy of the frame 140(1), and the pixels representing the first and second copies of the subregion 142(1), 142(2) are at a bottom of the 2D array 138 of pixels in a side-by-side arrangement. The sub-arrays 142(1) and 142(2) in the packing layout 300B may have M pixels in a horizontal dimension and N pixels in a vertical dimension, similar to that shown in FIG. 3A.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
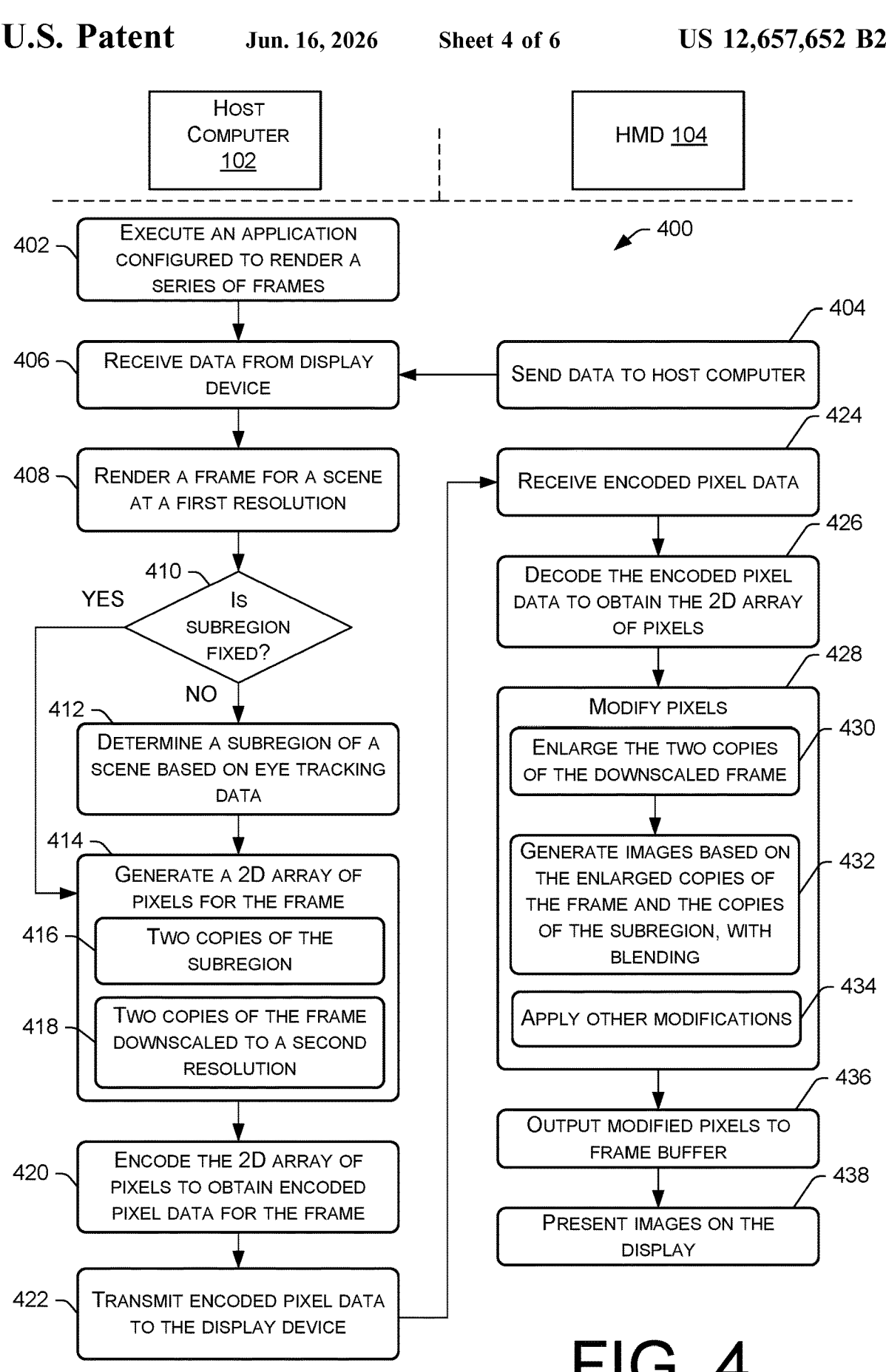
FIG. 4 illustrates a flow diagram of an example process for implementing dual detail encoding in a distributed display system, in accordance with embodiments disclosed herein.

FIG. 4 illustrates a flow diagram of an example process 400 for implementing dual detail encoding in a distributed display system 100, in accordance with embodiments disclosed herein. For discussion purposes, the process 400 is described with reference to the previous figures.

At 402, logic of the host computer 102 may execute an application 132 (e.g., graphics-rendering application) thereon, such as a video game 132(1), that is tasked with rendering a frame of a series of frames for purposes of creating visual video game content to be displayed on the display device (e.g., the HMD 104). The following blocks 404-438 of the process 400 may represent sub-operations involved in rendering a frame of a series of frames, and presenting corresponding imagery on a display panel(s) 108 of the HMD 104.

At 404, the HMD 104 may send to the host computer 102 that is communicatively coupled to the HMD 104, data 122 that is to be used by the host computer 102 to render a frame. In the case of the HMD 104, the data sent at block 404 may comprise head tracking data generated by a head tracking system 118, eye tracking data generated by the eye tracking system 120, and/or other data. In the case of another type of display device, such as a portable game device with a display, the data 122 sent at block 404 may comprise control input data (e.g., data corresponding to controls (e.g., buttons) pressed, touched, or otherwise manipulated on the game device). In the case of handheld controllers, positional controller data and/or auxiliary input data (e.g., touch sensing data, finger tracking data, etc.) may be sent to the host computer 102 at block 404. Positional data of one or more handheld controllers may be forward-predicted to the location that the controller(s) would be in when the frame is displayed to the user 106. For an implementation where the host computer 102 is wirelessly coupled to the HMD 104, the data 122 may be transmitted wirelessly from the HMD 104 to the host computer 102 at block 404. Although any suitable wireless communication protocol can be used, an 502.11 protocol may be used to transmit data 122, 136 between the HMD 104 and the host computer 102, in some examples.

At 406, the host computer 102 may receive the data 122 from the display device (e.g., the HMD 104). Although the data 122 may be received in various ways depending on the implementation (e.g., wirelessly, over a wired connection, via a wide-area network, etc.), the data, in at least one embodiment, may be received wirelessly via the communications interface(s) 134 of the host computer 102 at block 406.

At 408, the application 132 executing on the host computer 102 may render a frame for a scene at a first resolution. In some examples, the frame is rendered based on a predicted illumination time representing a time at which light emitting elements of the display panel(s) 108 of the display device (e.g., the HMD 104) will illuminate for the given frame. That is, the logic of the host computer 102 may determine a time when the photons associated with the imagery that is presented for the given frame will actually reach the user's 106 eye(s). This predicted illumination time is a time in the future (e.g., 20-40 ms in the future) because it takes time for the application 132 to generate the pixel data for the frame, and it takes time for the pixel data to be encoded and transmitted from the host computer 102 to the HMD 104. It also takes time for the pixel data to be decoded, modified, and scanned out on the HMD 104 before a corresponding image is ultimately presented on the display panel(s) 108 of the display device (e.g., the HMD 104).

In some examples, the frame is rendered at block 408 based on a predicted pose that the HMD 104 will be in at the predicted illumination time. For example, the head tracking system 118 of the HMD 104 may be configured to track up to six degrees of freedom of the HMD 104 (e.g., 3D position, roll, pitch, and yaw), which can be sent in the data 122 to the host computer 102 to determine a predicted pose of the HMD 104 (e.g., accounting for predicted head movement resulting in a future pose of the HMD 104). Accordingly, pose data indicative of the predicted pose may be provided to the application 132 for rendering the frame at block 408. For instance, the application 132 may call a function to receive pose data, and, in response to the function call, the application 132 may be provided with the requested pose data (predicted to the target illumination time for the given frame, and predicted based at least in part on the head tracking data received from the HMD 104) so that the application 132 can render the given frame according to the pose data, which corresponds to a virtual camera pose used to render the scene. The rendering at block 408 may involve the application 132 generating pixel data for the frame rendered at the first resolution (e.g., a resolution of 2.5 k, as described above). The pixel data generated at block 408 may include pixel values, as described herein, for individual pixels in the array of pixels.

At 410, if a subregion of the scene is not predetermined (or fixed), the process 400 may follow the NO route from block 410 to block 412 where logic of the host computer 102 determines the subregion based at least in part eye tracking data received from the display device (e.g., the HMD 104). This eye tracking data may have been sent in the data 122 at block 404, and it may be indicative of where the user 106 will be looking at the predicted illumination time for the frame. Accordingly, if the user 106 is predicted to be looking at a center of the display panel(s) 108 of the HMD 104, the subregion may be determined at block 412 to be a central subregion of the scene (or a center of the scene). If the user 106 is predicted to be looking at a left side of the display panel(s) 108 of the HMD 104, the subregion may be determined at block 412 to be a subregion that is left-of-center in the scene. If the subregion of the scene is predetermined (i.e., following the YES route from block 410), or after determining the subregion at block 412, the process 400 may proceed to block 414.

At 414, logic of the host computer 102 may generate a 2D array 138 of pixels for the frame. As shown by sub-blocks 416 and 418, the 2D array 138 of pixels may include two copies of the subregion 142(1), 142(2) of the scene, and two copies of the frame 140(1), 140(2) downscaled to a second resolution that is less than the first resolution at which the frame was rendered at block 408. For example, the 2D array 138 of pixels may include first pixels (e.g., a first group/sub-array of pixels) representing a first copy of the frame 140(1) downscaled to the second, reduced resolution, second pixels (e.g., a second group/sub-array of pixels) representing a second copy of the frame 140(2) downscaled to the second, reduced resolution, third pixels (e.g., a third group/sub-array of pixels) representing a first copy of the subregion 142(1) of the scene, and fourth pixels (e.g., a fourth group/sub-array of pixels) representing a second copy of the subregion 142(2). As described herein, the pixels in the 2D array 138 may be arranged in any suitable packing layout, such as the packing layout 300A, the packing layout 300B, or any other suitable packing layout. In the vertical packing layout 300A, the third pixels are at a top of the 2D array 138, the first pixels are below the third pixels, the fourth pixels are below the first pixels, and the second pixels are at a bottom of the 2D array of pixels, but this is merely an exemplary packing layout 300A that can be implemented at block 414.

As noted above, the pixels of the respective copies of the subregion 142(1), 142(2) in the 2D array 138 may correspond one-to-one with original pixels of the frame rendered at block 408. In other words, the respective copies of the subregion 142(1), 142(2) in the 2D array 138 may be exact copies of the subregions of the rendered images for the frame, without any resampling (e.g., without downscaling) the application-rendered subregions. In examples where the copies of the subregions 142(1), 142(2) in the 2D array 138 are downscaled, the downscaling of the subregions may be performed with idealized sampling, such as by downscaling the subregion in accordance with an integer ratio (e.g., 1:2), as described above.

At 420, the logic of the host computer 102 may encode the 2D array 138 of pixels to obtain encoded pixel data for the frame. In some embodiments, encoding and/or decoding may be performed at least partially in hardware (e.g., in silicon that is built into the respective GPUs and/or CPUs of the devices). Accordingly, the host computer 102 may utilize the encoder hardware of the GPU(s) 130 to encode the 2D array 138 of pixels at block 420. In some examples, the encoding performed at block 420 may include compressing and/or serialize data that is to be sent to the display device (e.g., the HMD 104) for purposes of rendering imagery associated with the frame. In some embodiments, the encoding performed at block 420 involves changing a format of the pixel data. For example, the encoding at block 420 may utilize a video encoding standard, such as High Efficiency Video Coding (HEVC) and/or extensions of HEVC, which is sometimes referred to as H.265 and/or MPEG-H Part 2. HEVC is an example of a standard that can be utilized at block 420, but it is to be appreciated that other suitable video encoding/compression standards can be utilized for at block 420, such as H.264 or VP9, for example. HEVC utilizes motion estimation for compressing pixel data, with the goal of sending less data than the uncompressed pixel data in a system where bandwidth constraints are present, yet the compressed data is sufficient to approximate the original, uncompressed data on the receiving end (e.g., at the HMD 104). In some examples, the operations performed at block 414 to generate the 2D array 138 of pixels for the frame are performed as part of the encoding operation(s) at block 420.

In some examples, the encoding at block 420 may including allocating bits to encode each group/sub-array of pixels in the 2D array 138 uniformly or with variability. For example, the encoder of the GPU 130 may allocate fewer bits to encode the first pixels (e.g., the first group/sub-array of pixels) representing a first copy of the frame 140(1) downscaled to the second, reduced resolution, and the second pixels (e.g., the second group/sub-array of pixels) representing a second copy of the frame 140(2) downscaled to the second, reduced resolution. Meanwhile, the encoder of the GPU 130 may allocate more bits to encode the third pixels (e.g., the third group/sub-array of pixels) representing a first copy of the subregion 142(1) of the scene, and the fourth pixels (e.g., the fourth group/sub-array of pixels) representing a second copy of the subregion 142(2). In other words, a first number of bits may be allocated for encoding the first pixels and the second pixels, and a second, larger number of bits may be allocated for encoding the third pixels and the fourth pixels so that more data is used to encode the copies of the subregions 142(1), 142(2) than the copies of the downscaled frames 140(1), 140(2). In some examples, logic of the host computer 102 may determine a subset of pixels representing the copies of the downscaled frames 140(1), 140(2) that will be occluded by the pixels of the subregions 142(1), 142(2) in the images 200(1), 200(2), and the encoder may, at block 420, allocate zero bits to the subset of pixels that will be occluded in the images 200(1), 200(2).

At 422, the host computer 102 may transmit (or send) to the display device (e.g., the HMD 104), and via the communications interface(s) 134, the encoded pixel data. In some examples, one or more data packets carrying the encoded pixel data are transmitted wirelessly at block 422 via a transceiver of the host computer 102. In some examples, the transmission at block 422 may utilize a transmission data rate of approximately 100 Mbps.

At 424, the display device (e.g., the HMD 104) may receive from the host computer 102, and via the communications interface(s) 124, the encoded pixel data for the frame (for the scene). In some examples, one or more data packets carrying the encoded pixel data are received wirelessly at block 424 via a transceiver of the display device (e.g., the HMD 104). In some examples, the reception at block 424 may utilize a reception data rate of approximately 100 Mbps.

At 426, logic of the display device (e.g., the HMD 104) may decode the encoded pixel data to obtain the 2D array 138 of pixels for the frame. In some embodiments, the display device (e.g., the HMD 104) may utilize the decoder hardware of the GPU(s) 114 to decode the encoded pixel data at block 426. In some examples, the decoding performed at block 426 may include decompressing and/or deserialize data for purposes of rendering imagery associated with the frame.

At 428, the logic of the display device (e.g., the HMD 104), such as the compositor 116, may modify the pixels in the 2D array 138 to obtain modified pixel data. As shown by sub-blocks 430 and 432, at least some of the modifications at block 428 may be for purposes of reconstructing the image(s) 200(1), 200(2) for the frame. In general, at block 430, the two copies of the previously-downscaled frame 140(1), 140(2) may be enlarged to obtain two enlarged copies of the frame 202(1), 202(2). At 432, images 200(1), 200(2) are generated based on these enlarged copies of the frame 202(1), 202(2) and the two copies of the subregion 142(1), 142(2), with blending at the peripheries 204(1), 204(2) of the subregions 142(1), 142(2). For example, to reconstruct a right image 200(2) (e.g., for a right display panel 108(2) of a stereo pair of display panels 108), the compositor 116 may, at block 430, enlarge the first copy of the frame 140(1) based at least in part on the corresponding pixels of the 2D array 138 to obtain a first enlarged copy of the frame 202(1), and may, at block 432, generate the right image 200(2) based at least in part on the first enlarged copy of the frame 202(1) and pixels of the 2D array 138 that represent the first copy of a subregion 142(1) of the scene, wherein a subset of the pixels at a periphery 204(1) of the subregion are blended in the right image 200(2). To reconstruct a left image of the two images, the compositor 116 may, at block 430, enlarge the second copy of the frame 140(2) based at least in part on the corresponding pixels of the 2D array 138 to obtain a second enlarged copy of the frame 202(2), and may generate the left image 200(1) based at least in part on the second enlarged copy of the frame 202(2) and pixels of the 2D array 138 that represent the second copy of the subregion 142(2), wherein a subset of the pixels at a periphery 204(2) of the subregion are blended in the left image 200(1).

As shown by sub-blocks 434, other modifications may be performed at block 428, such as modifications that compensate for geometric distortion, chromatic aberration, re-projection, and the like. In an example, other modifications applied to the pixels at block 434 may include re-projection adjustments that are based at least in part on an updated pose that the HMD 104 will be in at the illumination time for the given frame. For example, logic of the HMD 104 may determine, based at least in part on updated head tracking data generated by the head tracking system 118 of the HMD 104, an updated pose that the HMD 104 will be in at the illumination time for the given frame, which represents a time at which the light emitting elements of the display panel(s) 108 of the HMD 104 will illuminate for the given frame. Because this determination is closer in time to the illumination time for the given frame, the pose prediction by the HMD 104 may be more accurate (e.g., have less error) than the pose prediction that was determined by the host computer 102 further ahead the illumination time. Accordingly, the display device (e.g., the HMD 104) may compare the original predicted pose (which was based on the head tracking data received by the host computer 102 at block 406) to the updated pose, which may reveal a delta (or difference) between the compared poses, and the re-projection adjustments may include rotational calculations to compensate for this delta (e.g., by shifting and/or rotating the pixel data one way or another, depending on the delta between the two pose determinations). In other words, the head tracking data is used to "fix up" the projection of the image(s) that are rendered out to the display panel(s) 108.

At 436, the logic (e.g., the compositor 116) of the display device (e.g., the HMD 104) may output modified pixels (or modified pixel data) to a frame buffer(s) of the display device. Since the modified pixels represent the images 200(1), 200(2) depicted in FIG. 2, this is also described herein as outputting the images 200(1), 200(2) to the frame buffer(s). For a display device (e.g., a HMD 104) with a pair of display panels 108(1) and 108(2), this modified pixel data may correspond to a frame that represents a pair of images to be displayed on the pair of display panels 108(1) and 108(2), and may be output to a stereo frame buffer accordingly.

In some examples, the images 200(1), 200(2) may be output to the frame buffer in a single write operation or in multiple write operations. In a single write implementation, pixel values that are output to the frame buffer are output in a single pass and the pixel values are not overwritten. This single write implementation may involve the logic (e.g., the compositor 116) of the display device (e.g., the HMD 104) performing a lookup for each pixel to determine the pixel value to output based on the pixel modifications that were made at block 428. In a multi-write implementation, the compositor 116, in a first pass, may output, to the frame buffer(s), the pixel values corresponding to the enlarged copies of the frame 202(1), 202(2), even those pixel values that will eventually be occluded or blended in the overlap with the subregion 142(1), 142(2), and then, in a second pass, the compositor 116 may output, to the frame buffer(s), the pixel values corresponding to the copies of the subregion 142(1), 142(2) with blending at the periphery of the subregion 142(1), 142(2), which may overwrite some of the previously written pixel values from the first pass. In some examples, the blending is done in a third write operation (or third pass).

At 438, logic of the display device (e.g., the HMD 104) may cause images 200(1), 200(2) to be presented on respective display panels 108(1), 108(2) of the display device (e.g., the HMD 104) based on the pixel values (or pixel data) output to the frame buffer at block 436. This may involve scanning out the pixel data to the display panels 108(1) and 108(2) of the display device (e.g., the HMD 104) and illuminating light emitting elements of the display panels 108(1), 108(2) to illuminate the pixels on the display panels 108(1), 108(2).

Thus, the process 400 is an example technique for implementing a dual detail encoding scheme in a distributed display system 100. This dual detail encoding scheme reduces the amount of data that is to be transmitted from the host computer 102 to a display device (e.g., the HMD 104) so that pixel data can be streamed in a timely manner for display of corresponding imagery on the display device (e.g., the HMD 104), and in such a way that user 106 perceives the imagery as high-fidelity imagery on the display device (e.g., the HMD 104). For example, even though the portion of the displayed images 200(1), 200(2) outside of the subregion 142(1), 142(2) may be presented with relatively low quality (e.g., low resolution), the user's 106 gaze is likely to be directed at the subregion 142(1), 142(2) of the scene where the image quality is relatively higher, making it seem, to the user 106, as though the images are of high quality.

An alternative technique for transporting pixel data in a distributed display system 100 under data rate constraints is to distort the application-rendered images by enlarging the central portions of each image so that the visual information at the centers of the respective images is scaled to a larger size, encoding the distorted images to obtain encoded pixel data, and transmitting the encoded pixel data to the display device (e.g., the HMD 104). At the display device (e.g., the HMD 104), the encoded pixel data is decoded to obtain the distorted images, and the distortion is reversed at the HMD 104 to generate the images that are presented on the display panels 108(1), 108(2). This alternative technique is referred to herein as a "squinch" technique. In contrast to the dual detail encoding techniques described herein, the squinch technique provides a single level of detail per eye (as opposed to two levels of detail) in that the 2D array of pixels that is generated based on the aforementioned distortion of the application-rendered images comprises, for each eye, one copy of the frame that is distorted by enlarging the central portion of the scene. Application of the squinching technique can result in a 2D array of pixels that has fewer pixels than the application-rendered frame, making it suitable for transporting pixel data under data rate constraints of, say, 100 Mbps. For example, a video game executing on the host computer 102 may be rendering frames at a resolution of 2.5 k pixels (i.e., an image with 2500×2500 pixels) per eye, which equates to 12,500,000 pixels across two images for a HMD 104 with two display panels 108(1), 108(2), and the squinch technique described above can result in a 2D array of pixels that is on the order of 1500×1500 pixels per eye, which equates to 4,500,000 pixels that are to be transmitted to the HMD 104 for a given frame. Thus, the squinch solution can reduce the amount of data that is to be transported in a distributed display system 100, but the dual detail encoding scheme described herein can reduce the amount of data to a greater extent. Furthermore, the squinch solution may suffer from resampling artifacts on the display device, such as aliasing, blurring, or the like.

Figures 5A, 5B, 5C:
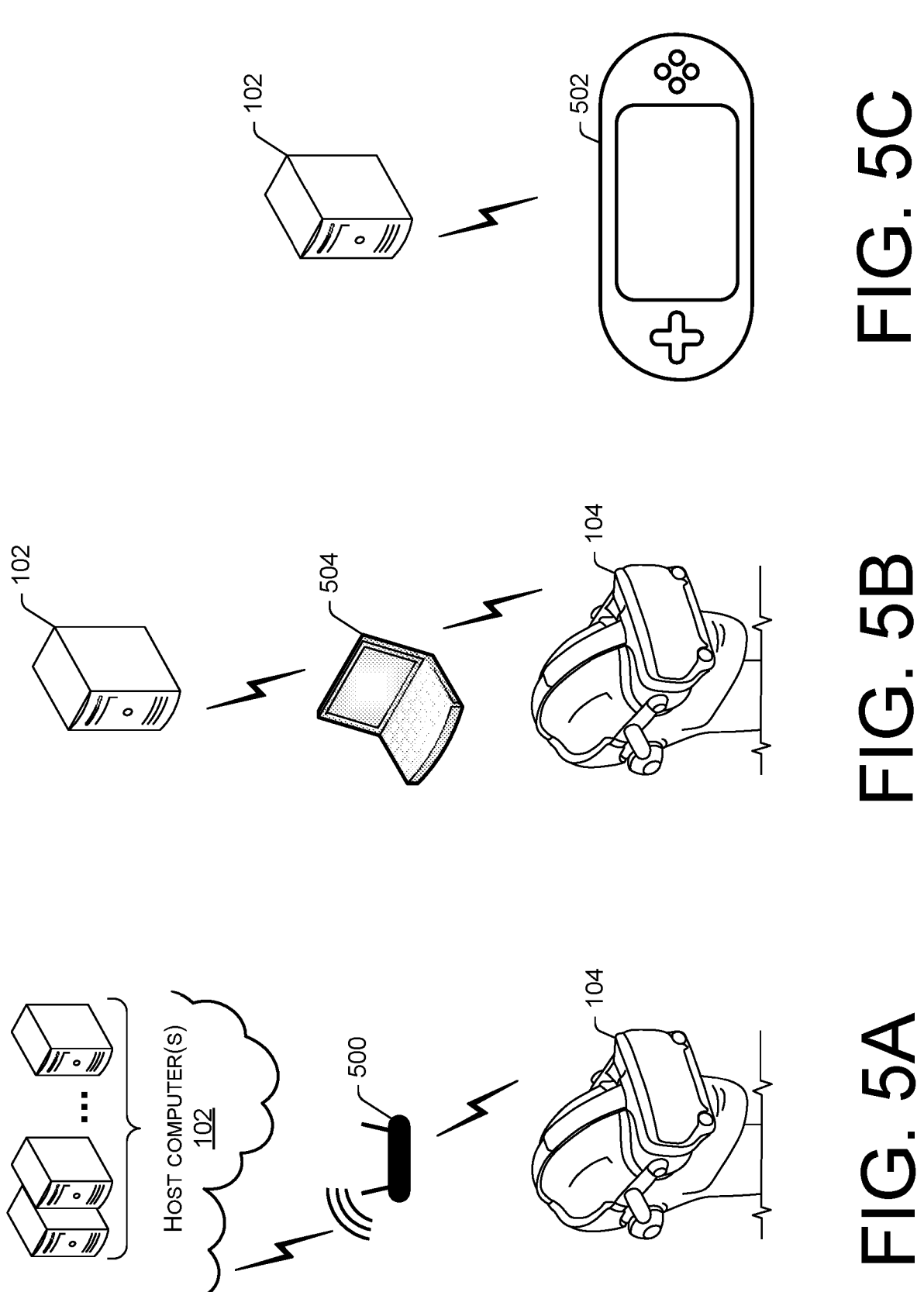
FIGS. 5A, 5B, and 5C illustrate alternative setups of a system for streaming data from a host computer to a display device, in accordance with embodiments disclosed herein.

FIGS. 5A, 5B, and 5C illustrate alternative setups of a system for streaming data from a host computer 102 to a display device, in accordance with embodiments disclosed herein. Briefly referring to FIG. 1, an example implementation is where the host computer 102 is collocated in an environment with the display device in the form of a HMD 104 worn by the user 106. For example, the host computer 102 may be located in the user's 106 house while the user 106 is using the HMD 104 in the house, regardless of whether the host computer 102 is located in the same room or a different room as the HMD 104. Alternatively, the host computer 102 in the form of a mobile computing device (e.g., a tablet or laptop) may be carried (e.g., in a backpack on the back of the user 106), thereby allowing for greater mobility. For example, the user 106 could be located in a public park while using such a system.

FIG. 5A shows an alternative implementation where the host computer 102 represents one or more server computers located at a geographically remote location with respect to the HMD 104. In this case, the HMD 104 may be communicatively coupled to the host computer(s) 102 via an access point (AP) 500, such as a wireless AP (WAP), a base station, a USB wireless dongle, etc. In an illustrative example, data is exchanged (e.g., streamed) between the host computer 102 and the HMD 104 via the AP 500, such as by streaming data over the Internet. In this implementation, the host computer 102 and/or the HMD 104 may implement one or more of the dual detail encoding techniques described herein.

FIG. 5B shows yet another alternative implementation where the host computer 102 is communicatively coupled to the HMD 104 via an intermediate computing device 504, such as a laptop or a tablet computer. A difference between FIGS. 5A and 5B is that the AP 500 in FIG. 5A may act as a data routing device for a server computer 102 that is remotely located with respect to the HMD 104, while the intermediate computing device 504 of FIG. 5B may act as a data routing device for a host computer 102 that is collocated within the same environment as the HMD 104. The intermediate computing device 504 may even perform a portion of the rendering workload (e.g., reconstructing pixel data and/or modifying pixel data, as described herein) so that the HMD 104 can remain as "light-weight" as possible.

FIG. 5C shows yet another alternative implementation where the HMD 104 is replaced by another type of display device in the form of a portable game device 502 with a display. In the setup of FIG. 5C, the portable game device 502 may send control input data to the host computer 102 as the user 106 manipulates the controls of the portable game device 502 with his/her hands, and the host computer 102 may generate pixel data based at least in part on the control input data, and may transmit the encoded pixel data to the portable game device 502, as described herein predominantly with respect to a HMD 104. Accordingly, traditional game-streaming systems that are challenged by the adverse environment on most home networks may benefit from the dual detail encoding techniques and systems described herein. For example, a home personal computer running a gaming platform/application 132 may allow for continuous playback of video streams and gameplay interactions with significant data rate constraints. Use of a gaming streaming service according to the techniques and systems described herein may enable a higher quality of gameplay experience in an environment with limited bandwidth. Furthermore, while the techniques are predominantly described herein with reference to VR gaming, some or all of the techniques may apply equally to the 2D/3D gaming realm.

Figure 6:
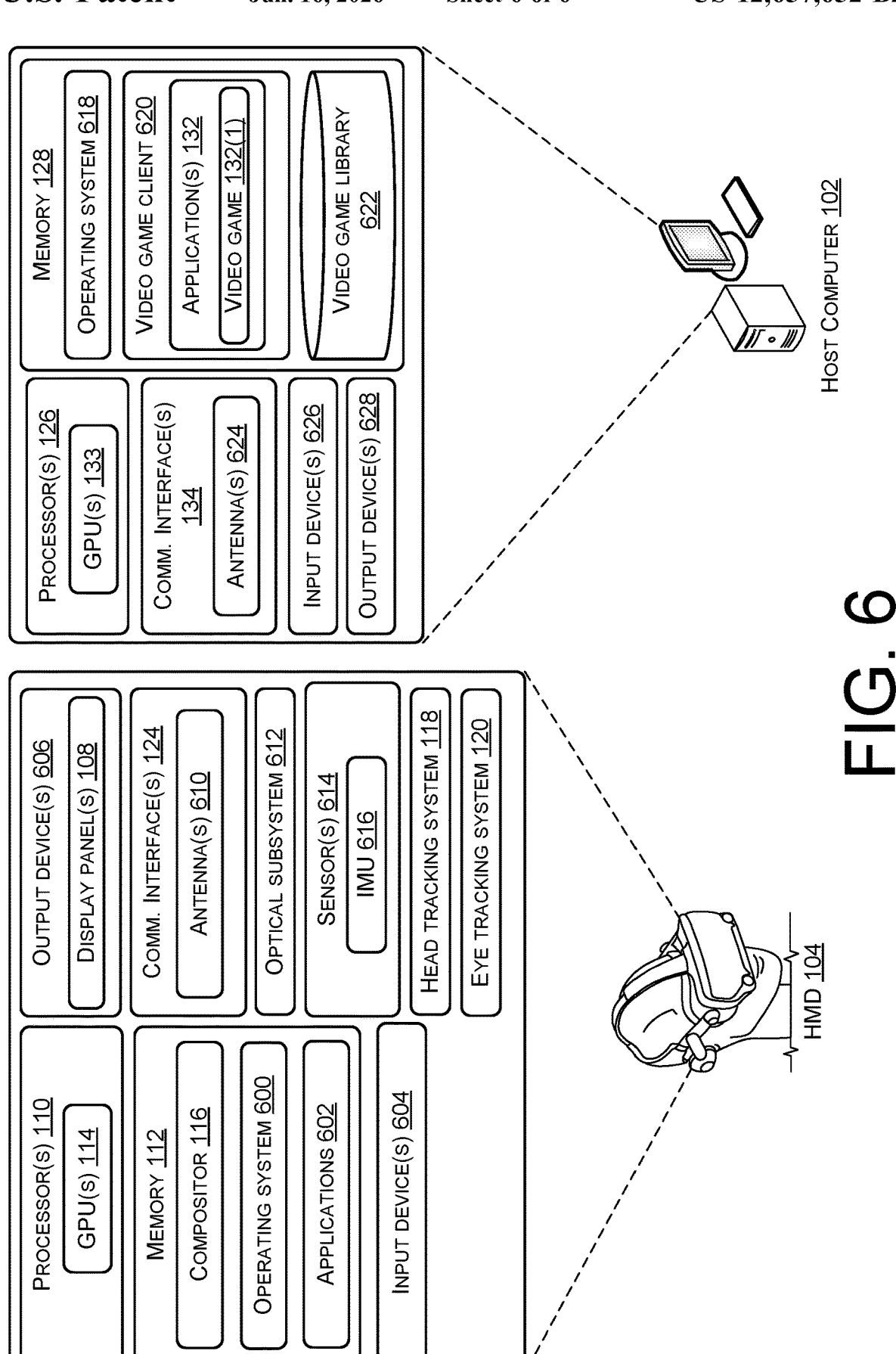
FIG. 6 illustrates example components of a display device, such as a HMD (e.g., a VR headset), and a host computer, in which the techniques disclosed herein can be implemented.

FIG. 6 illustrates example components of a wearable device, such as a HMD 104 (e.g., a VR headset), and a host computer 102, in which the techniques disclosed herein can be implemented, according to the embodiments disclosed herein. It is to be appreciated, however, that relevant components described with respect to the HMD 104 may be implemented in other types of display devices (e.g., the portable game device 502), except that irrelevant components may be omitted from those other types of display devices. The HMD 104 may be implemented as a connected device that is communicatively coupled to the host computer 102 during operation, and/or as a standalone device. In either mode of operations, the HMD 104 is to be worn by a user 106 (e.g., on a head of the user 106). In some embodiments, the HMD 104 may be head-mountable, such as by allowing a user 106 to secure the HMD 104 on his/her head using a securing mechanism (e.g., an adjustable band) that is sized to fit around a head of a user 106. In some embodiments, the HMD 104 comprises a VR, AR, and/or MR headset that includes a near-eye or near-to-eye display (s). As such, the terms "wearable device", "wearable electronic device", "VR headset", "AR headset", "MR headset", and "head-mounted display (HMD)" may be used interchangeably herein to refer to the device 104 of FIG. 6. However, these types of devices are merely example of a HMD 104, and it is to be appreciated that the HMD 104 may be implemented in a variety of other form factors. It is also to be appreciated that some or all of the components shown in FIG. 6 may be implemented on the HMD 104. Accordingly, in some embodiments, a subset of the components shown as being implemented in the HMD 104 may be implemented on the host computer 102 or another computing device that is separate from the HMD 104.

In the illustrated implementation, the HMD 104 includes the aforementioned processor(s) 110, which may include one or more GPUs 114, as well as the memory 112 storing the compositor 116 that are executable by the processor(s) 110, the display panel(s) 108, the head tracking system 118, the eye tracking system 120, and the communications interface(s) 124.

The HMD 104 may include a single display panel 108 or multiple display panels 108, such as a left display panel 108(1) and a right display panel 108(2) of a stereo pair of display panels. The one or more display panels 108 of the HMD 104 may be used to present a series of image frames (herein referred to as "frames") that are viewable by the user 106 wearing the HMD 104. It is to be appreciated that the HMD 104 may include any number of display panels 108 (e.g., more than two display panels, a pair of display panels, or a single display panel). Hence, the terminology "display panel," as used in the singular herein, may refer to either display panel 108 of a pair of display panels of a two-panel HMD 104, or it may refer to a single display panel 108 of a HMD 104 with any number of display panels (e.g., a single-panel HMD 104 or a multi-panel HMD 104). In a two-panel HMD 104, a stereo frame buffer may render pixels on both display panels of the HMD 104. In a single-panel HMD 104, the HMD 104 may include a single display panel 108 and a pair of lenses, one for each eye to view a corresponding image displayed on a portion of the display panel 108.

The display panel(s) 108 of the HMD 104 may utilize any suitable type of display technology, such as an emissive display that utilizes light emitting elements (e.g., light emitting diodes (LEDs)) or laser illumination to emit light during presentation of frames on the display panel(s) 108. As an example, display panel(s) 108 of the HMD 104 may comprise liquid crystal displays (LCDs), organic light emitting diode (OLED) displays, inorganic light emitting diode (ILED) displays, or any other suitable type of display technology for HMD applications.

The display panel(s) 108 of the HMD 104 may operate at any suitable refresh rate, such as a 90 Hertz (Hz) refresh rate, a 120 Hz refresh rate, or the like, which can be a fixed refresh rate or a variable refresh rate that dynamically varies over a range of refresh rates. The "refresh rate" of a display is the number of times per second the display redraws the screen. The number of frames displayed per second may be limited by the refresh rate of the display, if using a fixed refresh rate. Thus, a series of frames may be processed (e.g., rendered) and displayed as images on the display such that a single frame of the series of frames is displayed with every screen refresh. That is, in order to present a series of images on the display panel(s) 108, the display panel(s) 108 may transition from frame-to-frame, in the series of frames, at the refresh rate of the display, illuminating the pixels at every screen refresh.

The display system of the HMD 104 may implement any suitable type of display driving scheme, such as a global flashing type of display driving scheme, a rolling band type of display driving scheme, or any other suitable type of display driving scheme. In a global flashing type of display driving scheme, the array of light emitting elements of the display illuminate simultaneously at every screen refresh, thereby flashing globally at the refresh rate. In a rolling band type of display driving scheme, individual subsets of the light emitting elements of the display can be illuminated independently and sequentially in a rolling band of illumination during an illumination time period. These types of display driving schemes may be enabled by the light emitting elements being individually addressable. If the array of pixels and the array of light emitting elements on the display panel(s) 108 are arranged in rows and columns (but not necessarily with a one-pixel per one-light emitting element correspondence), individual rows and/or individual columns of light emitting elements may be addressed in sequence, and/or individual groups of contiguous rows and/or individual groups of contiguous columns of light emitting elements may be addressed in sequence for a rolling band type of display driving scheme.

In general, as used herein, "illuminating a pixel" means illuminating the light emitting element that corresponds to that pixel. For example, a LCD illuminates a light emitting element of a backlight to illuminate the corresponding pixel(s) of the display. Furthermore, as used herein, a "subset of pixels" may comprise an individual pixel or multiple pixels (e.g., a group of pixels). In order to drive the display panel(s) 108, the HMD 104 may include, among other things, a display controller(s), display driver circuitry, and similar electronics for driving the display panel(s) 108. Display driver circuitry may be coupled to the array of light emitting elements of the display panel(s) 108 via conductive paths, such as metal traces, on a flexible printed circuit. In an example, a display controller(s) may be communicatively coupled to the display driver circuitry and configured to provide signals, information, and/or data to the display driver circuitry. The signals, information, and/or data received by the display driver circuitry may cause the display driver circuitry to illuminate the light emitting elements in a particular way. That is, the display controller(s) may determine which light emitting element(s) is/are to be illuminated, when the element(s) is/are to illuminate, and the level of light output that is to be emitted by the light emitting element(s), and may communicate the appropriate signals, information, and/or data to the display driver circuitry in order to accomplish that objective.

The computer-readable media 112 may store additional functional modules that are executable on the processor(s) 110, although the same functionality may alternatively be implemented in hardware, firmware, or as a SOC, and/or other logic. For example, an operating system module 600 may be configured to manage hardware within and coupled to the HMD 104 for the benefit of other modules. In addition, in some instances the HMD 104 may include one or more applications 602 stored in the memory 112 or otherwise accessible to the HMD 104. For example, the application(s) 602 may include, without limitation, a video game application (e.g., a basic video game with graphics that are less-computationally-intensive to process), a video playback application (e.g., an application that accesses a video content library stored on the HMD 104 and/or in the cloud), etc. The HMD 104 may include any number or type of applications 602 and is not limited to the specific examples described herein.

Generally, the HMD 104 has input devices 604 and output devices 606. The input devices 604 may include control buttons. In some implementations, one or more microphones may function as input devices 604 to receive audio input, such as user voice input. In some implementations, one or more cameras or other types of sensors (e.g., inertial measurement unit (IMU)) may function as input devices 604 to receive gestural input, such as a hand and/or head motion of the user 106. In some embodiments, additional input devices 604 may be provided in the form of a keyboard, keypad, mouse, touch screen, joystick, and the like. In other embodiments, the HMD 104 may omit a keyboard, keypad, or other similar forms of mechanical input. Instead, the HMD 104 may be implemented relatively simplistic forms of input device 604, a network interface (wireless or wire-based), power, and processing/memory capabilities. For example, a limited set of one or more input components may be employed (e.g., a dedicated button to initiate a configuration, power on/off, etc.) so that the HMD 104 can thereafter be used. In one implementation, the input device(s) 604 may include control mechanisms, such as basic volume control button(s) for increasing/decreasing volume, as well as power and reset buttons.

The output devices 606 may include a display panel(s) 108, which may include one or multiple display panels 108 (e.g., a stereo pair of display panels 108), as described herein. The output devices 606 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 104 may further include the communications interface(s) 124 including, without limitation, one or more antennas 910 (E.g., of a transceiver) to facilitate a wireless connection to a network and/or to a second device, such as the host computer 102, as described herein. The communications interface(s) 124 may implement one or more of various wireless technologies, such as Wi-Fi, Bluetooth, radio frequency (RF), and so on. It is to be appreciated that the communications interface(s) 124 of the HMD 104 may further include physical ports to facilitate a wired connection to a network and/or a second device, such as the host computer 102.

The HMD 104 may further include optical subsystem 612 that directs light from the display panel(s) 108 to a user's eye(s) using one or more optical elements. The optical subsystem 612 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 612 may have one or more coatings, such as anti-reflective coatings. Magnification of the image light by optical subsystem 612 allows display panel(s) 108 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 612 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to display panel(s) 108 for display is pre-distorted (e.g., by the applied geometric distortion adjustments and/or chromatic aberration adjustments described herein), and optical subsystem 612 corrects the distortion when it receives image light from display panel(s) 108 generated based on the content.

The HMD 104 may further include one or more sensors 614, such as sensors used to generate motion, position, and orientation data. These sensors 614 may be or include gyroscopes, accelerometers, magnetometers, video cameras, color sensors, or other motion, position, and orientation sensors. The sensors 614 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 104 may include light sensors that are sensitive to light (e.g., infrared or visible light) that is projected or broadcast by base stations in the environment of the HMD 104.

In an example, the sensor(s) 614 may include an inertial measurement unit (IMU) 616. IMU 616 may be an electronic device that generates calibration data based on measurement signals received from accelerometers, gyroscopes, magnetometers, and/or other sensors suitable for detecting motion, correcting error associated with IMU 616, or some combination thereof. Based on the measurement signals such motion-based sensors, such as the IMU 616, may generate calibration data indicating an estimated position of HMD 104 relative to an initial position of HMD 104. For example, multiple accelerometers may measure translational motion (forward/back, up/down, left/right) and multiple gyroscopes may measure rotational motion (e.g., pitch, yaw, and roll). IMU 616 can, for example, rapidly sample the measurement signals and calculate the estimated position of HMD 104 from the sampled data. For example, IMU 616 may integrate measurement signals received from the accelerometers over time to estimate a velocity vector and integrates the velocity vector over time to determine an estimated position of a reference point on HMD 104. The reference point is a point that may be used to describe the position of the HMD 104. While the reference point may generally be defined as a point in space, in various embodiments, reference point is defined as a point within HMD 104 (e.g., a center of the IMU 616). Alternatively, IMU 616 provides the sampled measurement signals to an external console (or other computing device), which determines the calibration data. The sensors 614 may include sensors of one or more handheld controllers that are part of a HMD system. Accordingly, in some embodiments, the controllers may transmit sensor data to the host computer 102 and the host computer 102 may fuse the sensor data it receives from the HMD 104 and the handheld controller(s).

The sensors 614 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 614 may include light sensors that are sensitive to light emitted by base stations in the environment of the HMD 104 for purposes of tracking position and/or orientation, pose, etc., of the HMD 104 in 3D space. The calculation of position and/or orientation may be based on timing characteristics of light pulses and the presence or absence of light detected by the sensors 614.

The HMD 104 may further include the aforementioned head tracking system 118. The head tracking system 118 may leverage one or more of the sensor 614 to track head motion, including head rotation, of the user 106, as described above. For example, the head tracking system 118 can track up to six degrees of freedom of the HMD 104 (i.e., 3D position, roll, pitch, and yaw). These calculations can be made at every frame of a series of frames so that the application 132 can determine how to render a scene in the next frame in accordance with the head position and orientation. In some embodiments, the head tracking system 118 is configured to generate head tracking data that is usable to predict a future pose (position and/or orientation) of the HMD 104 based on current and/or past data, and/or based on the known/implied scan out latency of the individual subsets of pixels in a display system. This is because the application 132 is asked to render a frame before the user 106 actually sees the light (and, hence, the image) on the display panel(s) 108. Accordingly, a next frame can be rendered based on this future prediction of head position and/or orientation that was made at an earlier point in time. Rotation data provided by the head tracking system 118 can be used to determine both direction of HMD 104 rotation, and amount of HMD 104 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 104.

The HMD 104 may further include the aforementioned eye tracking system 120 that generates eye tracking data. The eye tracking system 120 may include, without limitation, a camera or other optical sensor inside HMD 104 to capture image data (or information) of a user's eyes, and the eye tracking system 120 may use the captured data/information to determine motion vectors, interpupillary distance, interocular distance, a 3D position of each eye relative to HMD 104, including a magnitude of torsion and rotation (i.e., roll, pitch, and yaw) and gaze directions for each eye. In one example, infrared light is emitted within HMD 104 and reflected from each eye. The reflected light is received or detected by a camera of the eye tracking system 120 and analyzed to extract eye rotation from changes in the infrared light reflected by each eye. Many methods for tracking the eyes of a user 106 can be used by eye tracking system 120. Accordingly, eye tracking system 120 may track up to six degrees of freedom of each eye (i.e., 3D position, roll, pitch, and yaw) and at least a subset of the tracked quantities may be combined from two eyes of a user 106 to estimate a gaze point (i.e., a 3D location or position in the virtual scene where the user is looking), which may map to a location(s) on the display panel(s) 108 for predicting where the user 106 will be looking in terms of an individual subset (e.g., a row) or a group of contiguous subsets (e.g., a group of contiguous rows) of the pixels of the display panel(s) 108. For example, eye tracking system 120 may integrate information from past measurements, measurements identifying a position of a user's 106 head, and 3D information describing a scene presented by display panel(s) 108. Thus, information for the position and orientation of the user's 106 eyes is used to determine the gaze point in a virtual scene presented by HMD 104 where the user 106 is looking, and to map that gaze point to a location(s) on the display panel(s) 108 of the HMD 104.

In the illustrated implementation, the host computer 102 includes the aforementioned processor(s) 126, which may include one or more GPUs 130, as well as the memory 128 storing the application(s) 132, and the communications interface(s) 134.

The memory 128 may further store an operating system module 618 that is configured to manage hardware within and coupled to the host computer 102 for the benefit of other modules. The memory 128 may further store a video game client 620 that is configured to execute one or more video games, such as the video game 132(1), within a video game library 622. The video games in the video game library 622 may be retrieved and executed by loading the video game client 620. In an example, a user 106 may choose to play one of multiple video games they have purchased and downloaded to the video game library 622 by loading the video game client 620 and selecting a video game 132(1) to start execution of the video game 132(1). The video game client 620 may allow users to login to a video game service using credentials (e.g., a user account, password, etc.).

The host computer 102 may further include the communications interface(s) 134 including, without limitation, one or more antennas 624 (e.g., of a transceiver) to facilitate a wireless connection to a network and/or to a second device, such as the HMD 104. The communications interface(s) 134 may implement one or more of various wireless technologies, such as Wi-Fi, Bluetooth, radio frequency (RF), and so on. It is to be appreciated that the communications interface(s) 134 of the host computer 102 may further include physical ports to facilitate a wired connection to a network and/or a second device, such as the HMD 104 or another type of display device, such as the portable game device 502.

Generally, the host computer 102 has input devices 626 and output devices 628. The input devices 626 may a keyboard, keypad, mouse, touch screen, joystick, control buttons, microphones, cameras, and the like. The output devices 628 may include, without limitation, a display(s), a light element (e.g., LED), a vibrator to create haptic sensations, a speaker(s) (e.g., headphones), and/or the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A host computer comprising:
   a processor; and
   memory storing computer-executable instructions that, when executed by the processor, cause the host computer to:
   execute a graphics-rendering application to render a frame for a scene at a first resolution;
   generate a two-dimensional (2D) array of pixels for the frame, the 2D array of pixels comprising:
   first pixels representing a first copy of the frame downscaled to a second resolution less than the first resolution;
   second pixels representing a second copy of the frame downscaled to the second resolution;

third pixels representing a first copy of a subregion of the scene; and fourth pixels representing a second copy of the subregion;

encode the third pixels of the 2D array of pixels to obtain first encoded pixel data representing the first copy of the subregion;

transmit the first encoded pixel data to a display device while the first pixels of the 2D array of pixels are still being encoded;

encode the first pixels of the 2D array of pixels to obtain second encoded pixel data representing the first copy of the frame; and transmit the second encoded pixel data to the display device.

2. The host computer of claim 1, wherein:

the third pixels correspond one-to-one with original pixels of the frame that represent the subregion; and the fourth pixels correspond one-to-one with the original pixels.

3. The host computer of claim 1, wherein:

the third pixels represent the first copy of the subregion downscaled in accordance with an integer ratio; and the fourth pixels represent the second copy of the subregion downscaled in accordance with the integer ratio.

4. The host computer of claim 1, wherein the subregion is predetermined.

5. The host computer of claim 1, wherein the computer-executable instructions, when executed by the processor, further cause the host computer to determine the subregion based at least in part on eye tracking data received from the display device.

6. The host computer of claim 1, wherein generating the 2D array of pixels comprises arranging the pixels for the frame in a vertical packing layout having:

the third pixels at a top of the 2D array of pixels;

the first pixels below the third pixels;

the fourth pixels below the first pixels; and the second pixels at a bottom of the 2D array of pixels.

7. The host computer of claim 1, wherein the computer-executable instructions, when executed by the processor, further cause the host computer to:

allocate a first number of bits to encode the first pixels and the second pixels; and allocate a second number of bits to encode the third pixels and the fourth pixels, wherein the first number of bits is less than the second number of bits.

8. The host computer of claim 1, further comprising a transceiver, wherein transmitting the first encoded pixel data to the display device comprises wirelessly transmitting, via the transceiver, one or more first data packets carrying the first encoded pixel data, and wherein transmitting the second encoded pixel data to the display device comprises wirelessly transmitting, via the transceiver, one or more second data packets carrying the second encoded pixel data.

9. A method comprising:

rendering, by a graphics-rendering application executing on a host computer, a frame for a scene at a first resolution;

generating a two-dimensional (2D) array of pixels for the frame, the 2D array of pixels comprising:

first pixels representing a first copy of the frame downscaled to a second resolution less than the first resolution;

second pixels representing a second copy of the frame downscaled to the second resolution;

third pixels representing a first copy of a subregion of the scene; and fourth pixels representing a second copy of the subregion;

encoding the third pixels of the 2D array of pixels to obtain first encoded pixel data representing the first copy of the subregion;

transmitting the first encoded pixel data to a display device while the first pixels of the 2D array of pixels are still being encoded;

encoding the first pixels of the 2D array of pixels to obtain second encoded pixel data representing the first copy of the frame; and transmitting the second encoded pixel data to the display device.

10. The method of claim 9, wherein:

the third pixels correspond one-to-one with original pixels of the frame that represent the subregion; and the fourth pixels correspond one-to-one with the original pixels.

11. The method of claim 9, wherein the subregion is predetermined and corresponds to a center of the scene.

12. The method of claim 9, further comprising determining the subregion based at least in part on eye tracking data received from the display device.

13. The method of claim 9, wherein the generating of the 2D array of pixels comprises arranging the pixels for the frame in a vertical packing layout having:

the third pixels at a top of the 2D array of pixels;

the first pixels below the third pixels;

the fourth pixels below the first pixels; and the second pixels at a bottom of the 2D array of pixels.

14. The method of claim 9, further comprising:

allocating a first number of bits to encode the first pixels and the second pixels; and allocating a second number of bits to encode the third pixels and the fourth pixels, wherein the first number of bits is less than the second number of bits.

15. The method of claim 9, wherein the transmitting of the first encoded pixel data to the display device comprises wirelessly transmitting, via a transceiver of the host computer, one or more first data packets carrying the first encoded pixel data, and wherein the transmitting of the second encoded pixel data to the display device comprises wirelessly transmitting, via the transceiver, one or more second data packets carrying the second encoded pixel data.

16. The method of claim 9, wherein:

the subregion is a rectangle with M pixels in a horizontal dimension and N pixels in a vertical dimension; and the first copy of the frame and the second copy of the frame are each downscaled to M pixels in the horizontal dimension and N pixels in the vertical dimension.

17. The method of claim 9, wherein the first pixels, the second pixels, the third pixels, and the fourth pixels are arranged in a vertical packing layout of four sub-arrays that make up the 2D array of pixels, each of the four sub-arrays having M pixels in a horizontal dimension and N pixels in a vertical dimension.

18. The method of claim 9, wherein the first copy of the subregion and the second copy of the subregion are not downscaled.

19. The host computer of claim 1, wherein:

the subregion is a rectangle with M pixels in a horizontal dimension and N pixels in a vertical dimension; and the first copy of the frame and the second copy of the frame are each downscaled to M pixels in the horizontal dimension and N pixels in the vertical dimension.

20. The host computer of claim 1, wherein the first pixels, the second pixels, the third pixels, and the fourth pixels are arranged in a vertical packing layout of four sub-arrays that make up the 2D array of pixels, each of the four sub-arrays having M pixels in a horizontal dimension and N pixels in a vertical dimension.

* * * * *